(12) United States Patent
Seregin et al.

(10) Patent No.: US 11,388,394 B2
(45) Date of Patent: Jul. 12, 2022

(54) LOCAL ILLUMINATION COMPENSATION (LIC) FOR VIRTUAL PIPELINE DATA UNITS (VPDUS)

(71) Applicant: QUALCOMM Incorporated, San Diego, CA (US)

(72) Inventors: Vadim Seregin, San Diego, CA (US); Nan Hu, San Diego, CA (US); Cheng-Teh Hsieh, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 217 days.

(21) Appl. No.: 16/725,487

(22) Filed: Dec. 23, 2019

(65) Prior Publication Data

US 2020/0221078 A1 Jul. 9, 2020

Related U.S. Application Data

(60) Provisional application No. 62/788,725, filed on Jan. 4, 2019.

(51) Int. Cl.
| | |
|---|---|
| *H04N 19/105* | (2014.01) |
| *H04N 19/132* | (2014.01) |
| *H04N 19/176* | (2014.01) |
| *H04N 19/186* | (2014.01) |
| *H04N 19/30* | (2014.01) |

(52) U.S. Cl.
CPC ......... *H04N 19/105* (2014.11); *H04N 19/132* (2014.11); *H04N 19/176* (2014.11); *H04N 19/186* (2014.11); *H04N 19/30* (2014.11)

(58) Field of Classification Search
CPC .. H04N 19/105; H04N 19/132; H04N 19/176; H04N 19/186; H04N 19/30
See application file for complete search history.

(56) References Cited

U.S. PATENT DOCUMENTS

| | | | | |
|---|---|---|---|---|
| 2021/0051345 | A1* | 2/2021 | Tsai | H04N 19/46 |
| 2021/0243458 | A1* | 8/2021 | Abe | H04N 19/105 |

FOREIGN PATENT DOCUMENTS

| | | | | |
|---|---|---|---|---|
| EP | 3657794 A1 * | 5/2020 | | H04N 19/103 |
| KR | 20200078252 A * | 7/2020 | | |

* cited by examiner

*Primary Examiner* — Jae N Noh
(74) *Attorney, Agent, or Firm* — Polsinelli LLP

(57) ABSTRACT

Techniques are described herein for processing video data. For instance, a current block of a picture of the video data can be obtained, and it can be determined that the current block includes more than one virtual pipeline data unit (VPDU). Current neighbor samples for the current block, reference neighbor samples for the current block, and additional neighbor samples for the current block can be obtained for illumination compensation. One or more illumination compensation parameters can be determined for the current block using the current neighbor samples, the reference neighbor samples, and the additional neighbor samples. The additional neighbor samples are used for determining the one or more illumination compensation parameters based on the current block covering more than one VPDU. Illumination compensation can be performed for the current block using the one or more illumination compensation parameters.

30 Claims, 20 Drawing Sheets

Reference block

Current CU

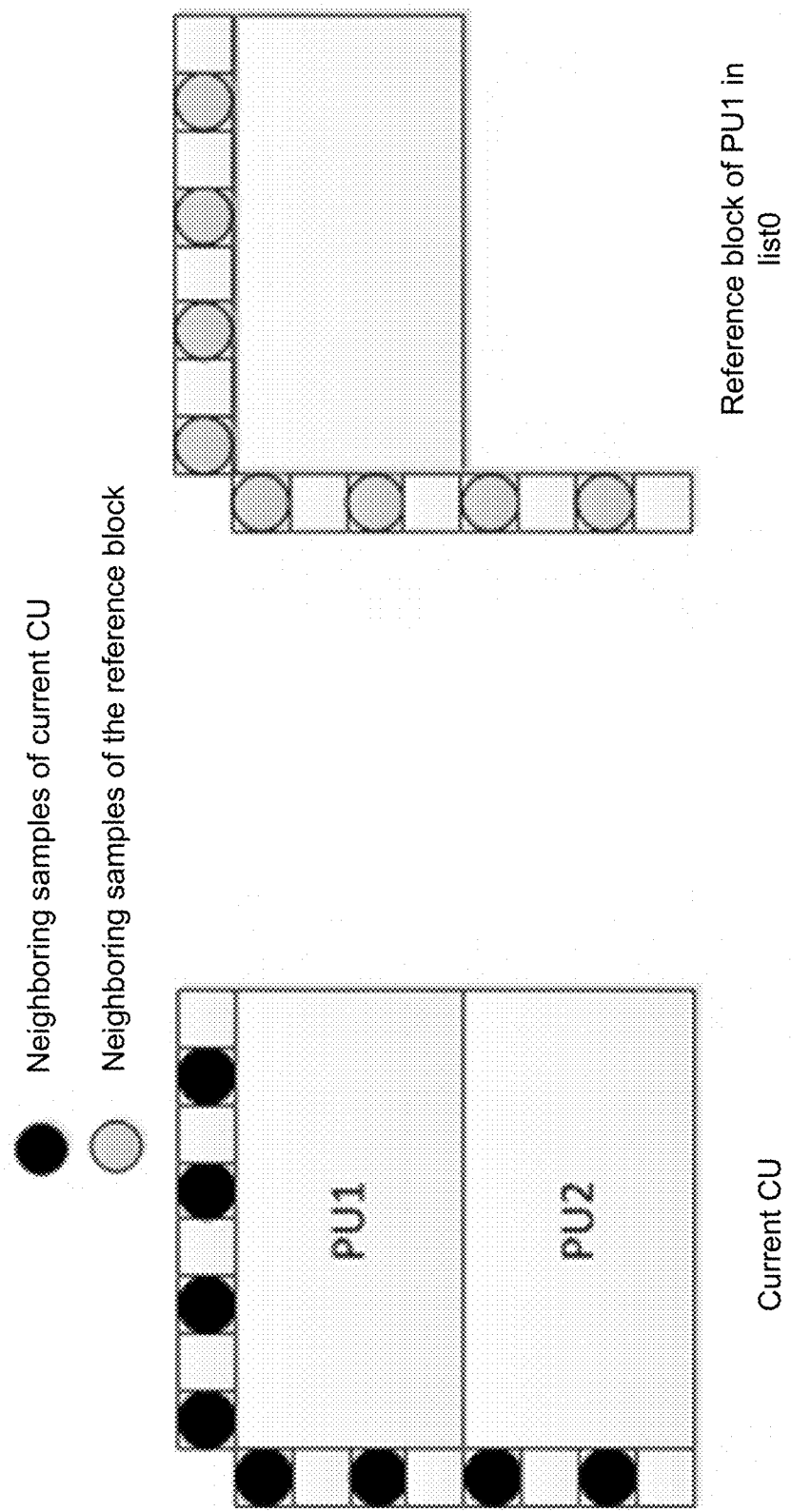

LOCAL ILLUMINATION COMPENSATION (LIC) FOR VIRTUAL PIPELINE DATA UNITS (VPDUS)

CROSS-REFERENCE TO RELATED APPLICATIONS

This application claims the benefit of U.S. Provisional Application No. 62/788,725, filed Jan. 4, 2019, which is hereby incorporated by reference, in its entirety and for all purposes.

FIELD

This application is related to video coding and compression. More specifically, this application relates to systems and methods of performing improved local illumination compensation.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Illumination compensation can be used to efficiently compensate variations in illumination between one or more pictures. Techniques are described herein to provide more efficient and less complex techniques for performing illumination compensation when a virtual pipeline data unit (VPDU) processing structure is used.

According to at least one example, a method of processing video data is provided. The method can include obtaining a current block of a picture of the video data, and determining the current block includes more than one virtual pipeline data unit (VPDU). The method can further include obtaining, for illumination compensation, current neighbor samples for the current block. The current neighbor samples include samples from one or more of a first row of samples from a first neighboring block of a first VPDU included in the current block or a first column of samples from a second neighboring block of the first VPDU. The method can further include obtaining, for illumination compensation, reference neighbor samples for the current block. The reference neighbor samples include samples from one or more of a first row of samples from a first neighboring block of a reference block or a first column of samples from a second neighboring block of the reference block. The method can further include obtaining, for illumination compensation, additional neighbor samples for the current block. The additional neighbor samples include samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block. The method can further include determining one or more illumination compensation parameters for the current block using the current neighbor samples, the reference neighbor samples, and the additional neighbor samples. The additional neighbor samples are used for determining the one or more illumination compensation parameters based on the current block covering more than one VPDU. The method can further include performing illumination compensation for the current block of the picture using the one or more illumination compensation parameters.

According to another example, an apparatus for processing video data is provided. The apparatus can include at least one memory and one or more processors implemented in circuitry. The one or more processors are configured to obtain a current block of a picture of the video data, and to determine the current block includes more than one virtual pipeline data unit (VPDU). The one or more processors are configured to obtain, for illumination compensation, current neighbor samples for the current block. The current neighbor samples include samples from one or more of a first row of samples from a first neighboring block of a first VPDU included in the current block or a first column of samples from a second neighboring block of the first VPDU. The one or more processors are configured to obtain, for illumination compensation, reference neighbor samples for the current block. The reference neighbor samples include samples from one or more of a first row of samples from a first neighboring block of a reference block or a first column of samples from a second neighboring block of the reference block. The one or more processors are configured to obtain, for illumination compensation, additional neighbor samples for the current block. The additional neighbor samples include samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block. The one or more processors are configured to determine one or more illumination compensation parameters for the current block using the current neighbor samples, the reference neighbor samples, and the additional neighbor samples. The additional neighbor samples are used for determining the one or more illumination compensation parameters based on the current block covering more than one VPDU. The one or more processors are configured to perform illumination compensation for the current block of the picture using the one or more illumination compensation parameters.

According to another example, a non-transitory computer-readable medium for coding video data is provided. The non-transitory computer-readable medium can include instructions stored thereon that, when executed by one or more processors, cause the one or more processors to: obtain a current block of a picture of the video data; determine the current block includes more than one virtual pipeline data unit (VPDU); obtain, for illumination compensation, current neighbor samples for the current block, the current neighbor samples including samples from one or more of a first row of samples from a first neighboring block of a first VPDU included in the current block or a first column of samples from a second neighboring block of the first VPDU; obtain, for illumination compensation, reference neighbor samples for the current block, the reference neighbor samples including samples from one or more of a first row of samples from a first neighboring block of a reference block or a first column of samples from a second neighboring block of the reference block; obtain, for illumination compensation, additional neighbor samples for the current block, the additional neighbor samples including samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block; determine one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and perform illumination compensation for the current block of the picture using the one or more illumination compensation parameters.

According to another example, an apparatus comprising means for coding video data is provided. The apparatus can include means for obtaining a current block of a picture of the video data, and means for determining the current block includes more than one virtual pipeline data unit (VPDU). The apparatus can include means obtaining, for illumination compensation, current neighbor samples for the current block. The current neighbor samples include samples from one or more of a first row of samples from a first neighboring block of a first VPDU included in the current block or a first column of samples from a second neighboring block of the first VPDU. The apparatus can include means obtaining, for illumination compensation, reference neighbor samples for the current block. The reference neighbor samples include samples from one or more of a first row of samples from a first neighboring block of a reference block or a first column of samples from a second neighboring block of the reference block. The apparatus can include means obtaining, for illumination compensation, additional neighbor samples for the current block. The additional neighbor samples include samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block. The apparatus can include means determining one or more illumination compensation parameters for the current block using the current neighbor samples, the reference neighbor samples, and the additional neighbor samples. The additional neighbor samples are used for determining the one or more illumination compensation parameters based on the current block covering more than one VPDU. The apparatus can include means performing illumination compensation for the current block of the picture using the one or more illumination compensation parameters.

In some aspects, the methods, apparatuses, and computer-readable media described above can include: determining a size of a VPDU; determining one or more of a width or a height of the current block; determining one or more of the width or the height of the current block is larger than the size of the VPDU; and determining the current block includes more than one VPDU based on determining one or more of the width or the height of the current block is larger than the size of the VPDU.

In some aspects, the first neighboring block of the first VPDU includes a top neighboring block, the second neighboring block of the first VPDU includes a left neighboring block, the first neighboring block of the reference block includes a top neighboring block, and the second neighboring block of the reference block includes a left neighboring block.

In some aspects, subsampling is not applied to samples from the first neighboring block of the first VPDU, samples from the second neighboring block of the first VPDU, samples from the first neighboring block of the reference block, and samples from the second neighboring block of the reference block when performing illumination compensation for the current block.

In some aspects, the additional neighbor samples include samples from the second row of samples from the first neighboring block of the first VPDU and samples from the second column of samples from the second neighboring block of the first VPDU. In some cases, the second row of samples from the first neighboring block of the first VPDU includes at least two rows of samples, and the second column of samples from the second neighboring block of the first VPDU includes at least two columns of samples.

In some aspects, the additional neighbor samples include samples from the second row of samples from the first neighboring block of the first VPDU, samples from second column of samples from the second neighboring block of the first VPDU, samples from the second row of samples from the first neighboring block of the reference block, and samples from the second column of samples from the second neighboring block of the reference block. In some cases, the second row of samples from the first neighboring block of the first VPDU includes at least two rows of samples, the second column of samples from the second neighboring block of the first VPDU includes at least two columns of samples, the second row of samples from the first neighboring block of the reference block includes at least two rows of samples, and the second column of samples from the second neighboring block of the reference block includes at least two columns of samples.

In some aspects, the additional neighbor samples include the samples from the neighboring block of the second VPDU included in the current block. In some cases, the additional neighbor samples include samples from a neighboring block of a third VPDU included in the current block. In some cases, the samples from the neighboring block of the second VPDU include a row of samples from the neighboring block of the second VPDU, and the samples from the neighboring block of the third VPDU include a column of samples from the neighboring block of the third VPDU. In some examples, the row of samples from the first neighboring block of the second VPDU includes at least two rows of samples, and the column of samples from the neighboring block of the third VPDU includes at least two columns of samples.

In some aspects, the additional neighbor samples include the samples from the neighboring block of the second VPDU, samples from the second row of samples from the first neighboring block of the reference block, and samples from the second column of samples from the second neighboring block of the reference block. In some cases, the samples from the neighboring block of the second VPDU include a row of samples from the neighboring block of the second VPDU and a column of samples from a neighboring block of a third VPDU.

In some aspects, the additional neighbor samples include one or more of samples to a right of a top neighboring row of the current block, samples below a left neighboring column of the current block, samples to a right of a top neighboring row of the reference block, or samples below a left neighboring column of the reference block.

In some aspects, determining the one or more illumination compensation parameters for the current block includes minimizing a difference between one or more of the samples from the first row of samples from the first neighboring block of the first VPDU or the samples from the first column of samples from the second neighboring block of the first VPDU and one or more of the samples from the first row of samples from the first neighboring block of the reference block or the samples from the first column of samples from the second neighboring block of the reference block.

In some aspects, the one or more illumination compensation parameters include at least one scaling factor and at least one offset.

In some aspects, the methods, apparatuses, and computer-readable media described above can include decoding the current block of video data based on performing the illumination compensation for the current block. In some cases, the methods, apparatuses, and computer-readable media described above can include: determining a residual value for the current block; performing a prediction mode for the current block; and reconstructing at least one sample of the current block based on the illumination compensation performed for the current block, the residual value for the current block, and the prediction mode performed for the current block.

In some examples, the methods, apparatuses, and computer-readable media described above can include generating an encoded video bitstream. The encoded video bitstream can include at least a portion of the current block of video data.

In some examples, the methods, apparatuses, and computer-readable media described above can include signaling the encoded video bitstream.

In some examples, the methods, apparatuses, and computer-readable media described above can include signaling the one or more illumination compensation parameters in the encoded video bitstream.

In some aspects, the apparatuses described above can include a mobile device. In some examples, the apparatus can include a camera for capturing one or more pictures. In some examples, the apparatus can include a display for displaying one or more pictures. For example, the apparatus can include a mobile device (or other device) with a camera for capturing one or more pictures. In another example, the apparatus can include a mobile device (or other device) with a display for displaying one or more pictures. In another example, the apparatus can include a mobile device (or other device) with a camera for capturing one or more pictures and a display for displaying the one or more pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 5A is a conceptual diagram illustrating an example of neighboring samples of a current coding unit used for derivation of illumination compensation (IC) parameters for the current coding unit, in accordance with some examples;

FIG. 5B is a conceptual diagram illustrating an example of neighboring samples of a reference block used for derivation of IC parameters for a current coding unit, in accordance with some examples;

DETAILED DESCRIPTION

Figure 1:
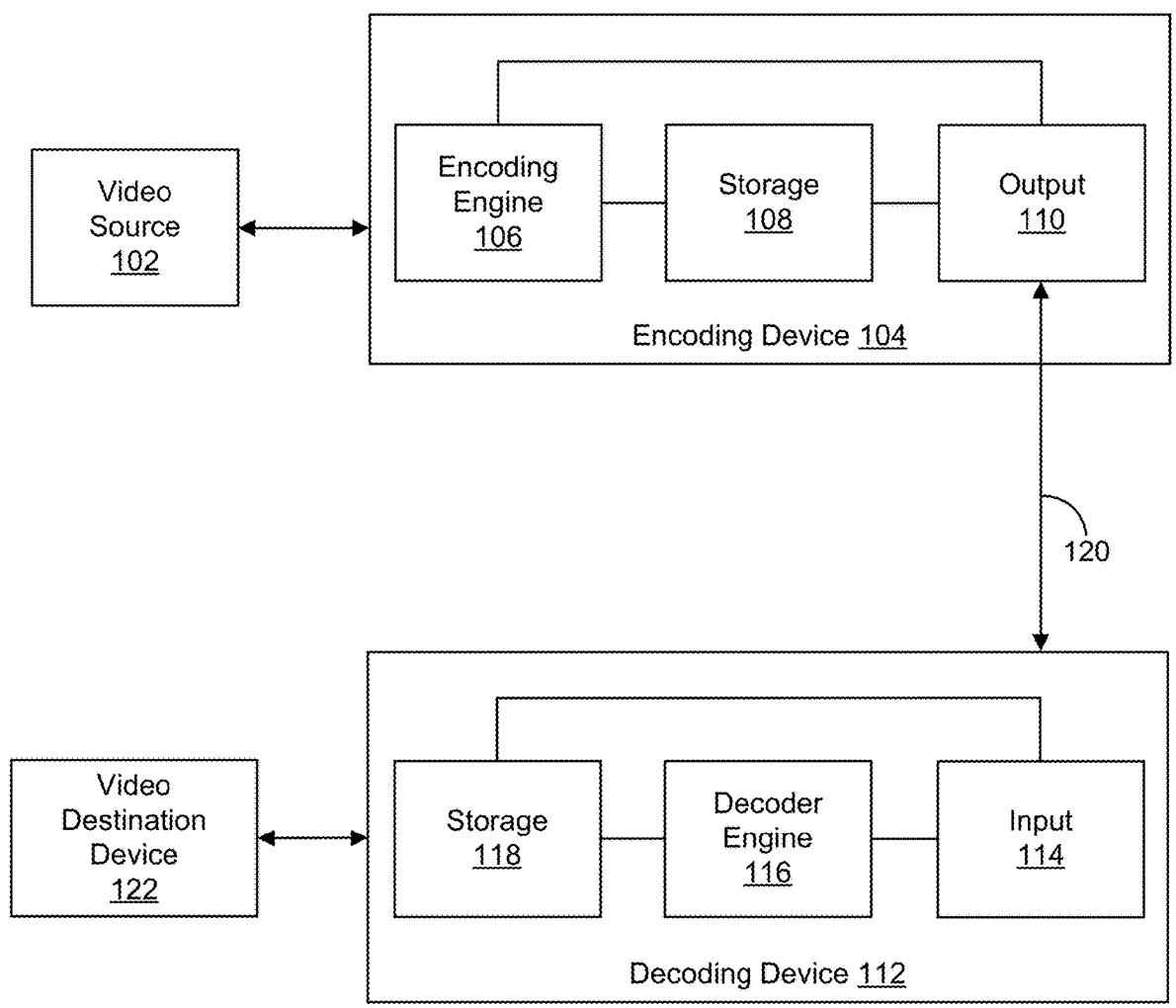
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, one or more systems and methods of processing video data are directed to deriving or estimating illumination compensation (IC) parameters in block based video coding. In some instances, a video encoder and/or a video decoder can perform local illumination compensation (LIC) (or illumination compensation) to efficiently code variations in illumination (e.g., brightness) between one or more pictures. The video encoder and/or the video decoder can determine one or more IC parameters (e.g., an offset, one or more scaling factors, a shift number, or other suitable IC parameters) for the coding block or coding unit being encoded or decoded. The IC parameters can be determined based on samples of multiple reference blocks, samples of one or more neighboring blocks of the current block, and/or other information. The video decoder can utilize the IC parameters and/or other data to construct predictive data for decoding the current block.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261. ISO/IEC MPEG-1 Visual, ITU-T H.262 or ISO/IEC MPEG-2 Visual, ITU-T H.263, ISO/IEC MPEG-4 Visual. ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $refIdx_0$) is used to generate a motion compensated prediction from a reference picture.

For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SE message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network. WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 11. An example of specific details of the decoding device 112 is described below with reference to FIG. 12.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2 . . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead. "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition: two 16×8 MB partitions: two 8×16 MB partitions; and four 8×8 MB partitions. Different MB partitions in one MB may have different reference index values for each direction (RefPicList0 or RetPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with or % size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2B:
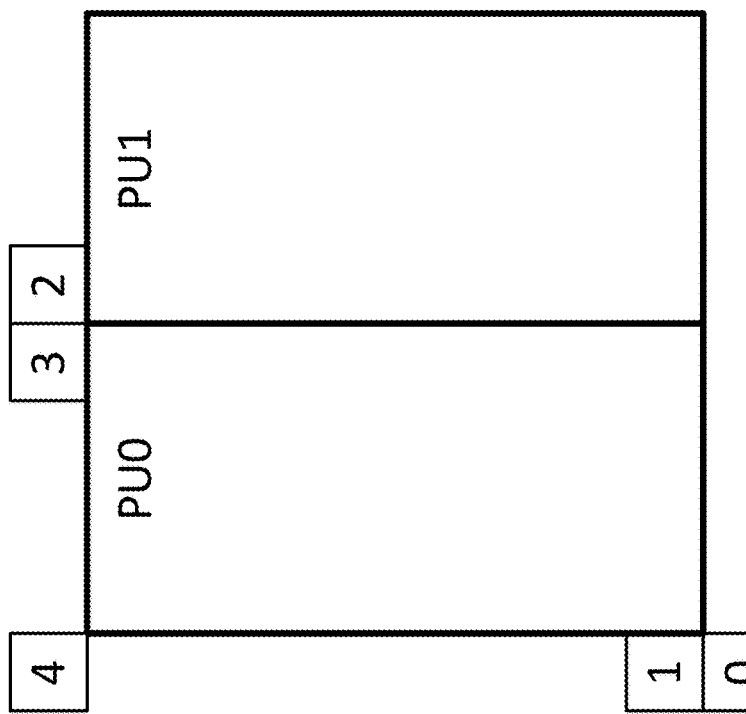
FIG. 2B is a conceptual diagram illustrating example spatial neighboring motion vector candidates for an advanced motion vector prediction (AMVP) mode, in accordance with some examples.
Figure 2A:
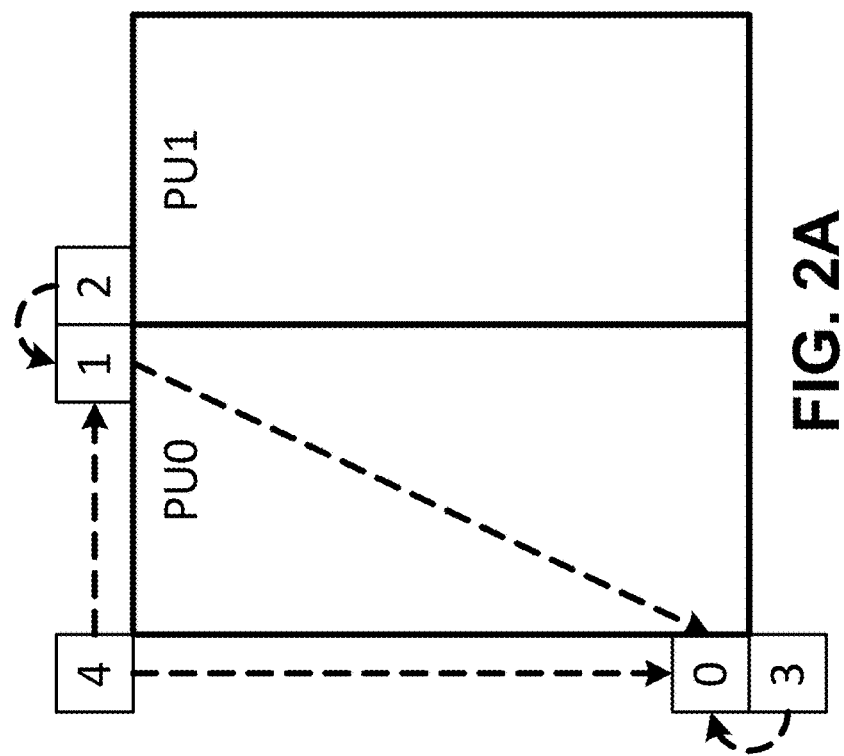
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
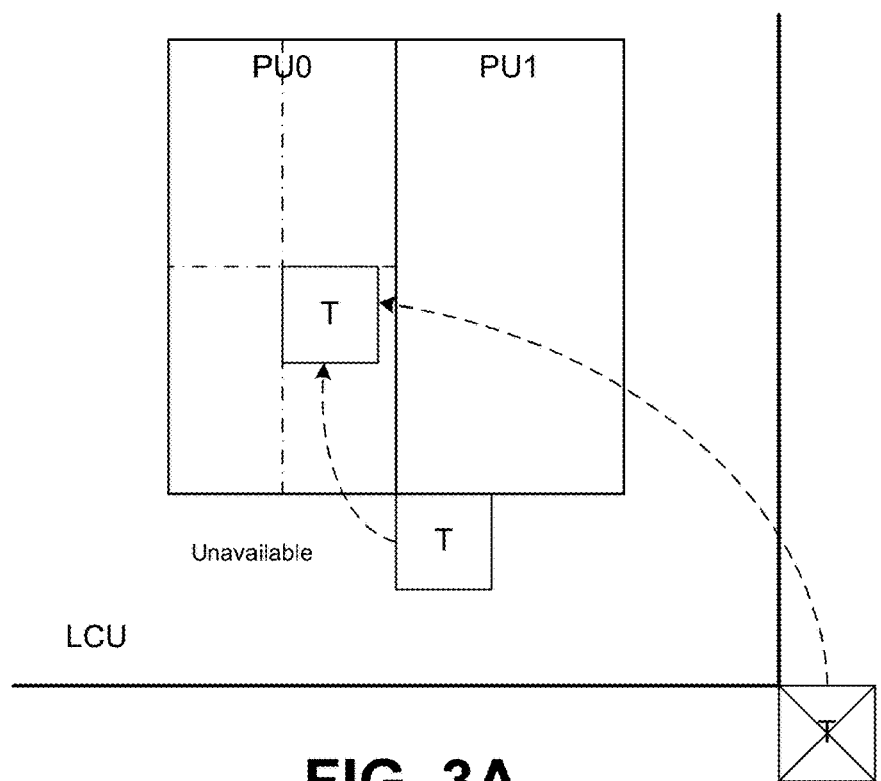
FIG. 3A is a conceptual diagram illustrating an example temporal motion vector predictor (TMVP) candidate, in accordance with some examples.
Figure 3B:
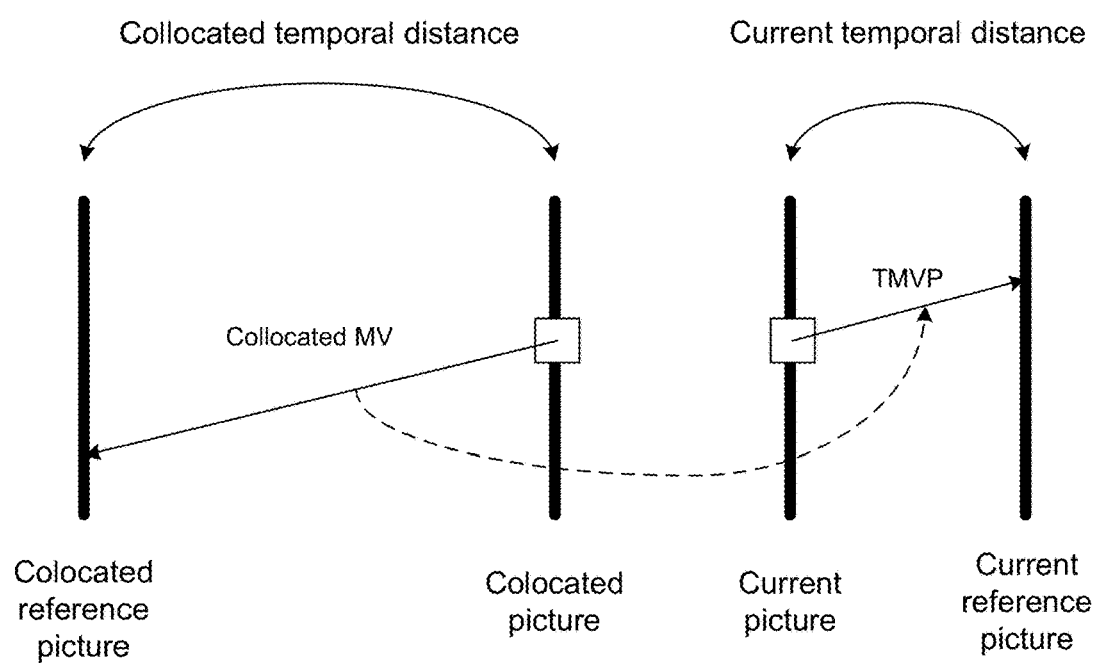
FIG. 3B is a conceptual diagram illustrating an example of motion vector scaling, in accordance with some examples.

FIG. 3A and FIG. 3B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

There are various related motion-prediction technologies. One prediction technology is illumination compensation (IC) or luminance compensation (also referred to in some cases as local illumination compensation (LIC)). The terms illumination compensation (IC) and local illumination compensation (LIC) are used interchangeably herein. IC was proposed for HEVC. For example, in JCTVC-C041, Partition Based Illumination Compensation (PBIC) was proposed. Different from weighted prediction (WP), which enables and/or disables WP, and signals WP parameters at the slice level (as described below), PBIC enables and/or disables IC and signals IC parameters at the prediction unit (PU) level to handle local illumination variation. In JVET-B0023, the block-based IC is extended to the CU, and similar to the PU in HEVC, the CU becomes the basic unit which carries the motion information in the QTBT structure.

Similar to Weighted Prediction (WP), which is described in more detail below, a scaling factor (also denoted by a) and an offset (also denoted by b) is used in IC, and the shift number is fixed to be 6. An IC flag is coded for each PU to indicate whether IC applies for current PU or not. If IC applies for the PU, a set of IC parameters (e.g., a and b) are signaled to the decoder and is used for motion compensation. In some examples, to save bits spent on IC parameters, the chroma component shares the scaling factors with luma component and a fixed offset 128 is used.

In 3D-HEVC, IC is enabled for inter-view prediction. Different from WP and PBIC, which signals IC parameters explicitly, IC derives IC parameters based on neighboring samples of current CU and neighboring samples of reference block. In some cases, IC applies to the 2N×2N partition mode only. In some examples, for AMVP mode, one IC flag is signaled for each CU that is predicted from an inter-view reference picture. In some examples, for merge mode, to save bits, an IC flag is signaled only when the merge index of the PU is not equal to 0. In some cases, IC does not apply to CU that is only predicted from temporal reference pictures.

With respect to derivation of IC parameters, the linear IC model used in inter-view prediction is shown in Equation (1):

$$p(i,j) = a*r(i+dv_x, j+dv_y) + b, \text{ where } (i,j) \in PU_c \quad \text{Equation (1)}$$

In Equation (1), $PU_c$ is the current PU, (i,j) is the coordinate of pixels in $PU_c$, $(dv_x, dv_y)$ is the disparity vector of $PU_c$, p(i, j) is the prediction of PU, r is the PU's reference picture from the neighboring view, and a and b are parameters of the linear IC model.

Figure 4B:
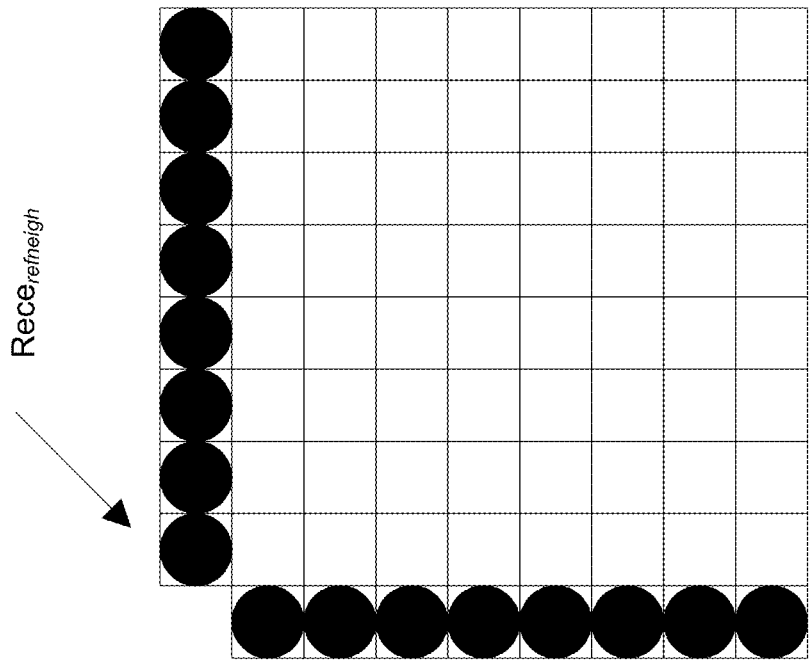
FIG. 4B is a conceptual diagram illustrating an example of neighboring samples of a reference block used for estimating IC parameters for a current coding unit, in accordance with some examples.
Figure 4A:
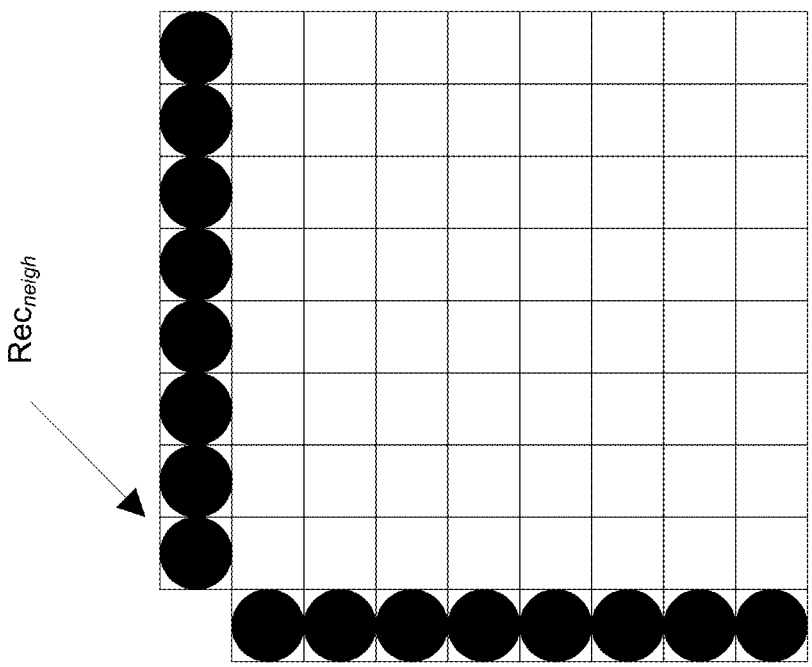
FIG. 4A is a conceptual diagram illustrating an example of neighboring samples of a current coding unit used for estimating illumination compensation (IC) parameters for the current coding unit, in accordance with some examples.

To estimate parameter a and b for a PU, two sets of pixels, as shown in FIG. 4A and FIG. 4B are used. The first set of pixels are shown in FIG. 4A and include available reconstructed neighboring pixels in a left column and an above row of the current CU (the CU that contains the current PU). The second set of pixels are shown in FIG. 4B and include corresponding neighboring pixels of the current CU's reference block. The reference block of the current CU is found by using the current PU's disparity vector.

Let $Rec_{neig}$ and $Rec_{refneig}$ denote the neighboring pixel set of the current CU and its reference block, respectively, and let 2N denote the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad \text{Equation (2)}$$

$$b = \frac{\sum_{i=0}^{2N-1} Rec_{neig}(i) - a \cdot \sum_{i=0}^{2N-1} Rec_{refneig}(i)}{2N} \quad \text{Equation (3)}$$

In some cases, only a is used in the linear model and b is always set equal to 0. In some cases, only b is used and a is always set equal to 1.

In HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p (x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

A local illumination compensation (LIC) method was also proposed in JEM. A description of LIC in JEM can be found in JVET-G1001. With respect to LIC in JEM, LIC is based on a linear model for illumination changes, using a scaling factor a and an offset b. Such LIC is enabled or disabled adaptively for each coded coding unit (CU) for which inter-prediction mode has been applied. When LIC applies for a CU, a least square error method is employed to derive the parameters a and b by using the neighboring samples of the current CU and their corresponding reference samples. For example, as illustrated in FIG. 5A and FIG. 5B, the subsampled (e.g., 2:1 subsampling) neighboring samples of the CU and the corresponding pixels (identified by motion information of the current CU or sub-CU) in the reference picture are used. In some examples, the IC parameters are derived and applied for each prediction direction separately. In some examples, an illumination compensation flag can be signalled for a CU to indicate whether LIC applies or not. In some examples, such as when a CU is coded with merge mode, the illumination compensation flag may be copied from neighboring blocks, in a way similar to motion information copy in merge mode.

According to LIC, the luminance value (of a sample, or pixel) is compensated for in inter-prediction in a linear form, a*p+b, where p is a sample in inter-prediction, a is a scaling factor, and b is an offset. The scaling factor a and offset b are the parameters derived using neighboring samples of the current block and neighboring samples of the reference block (e.g., as shown in FIG. 5A and FIG. 5B), which is used for inter-prediction. For example, inter-prediction can first be derived using motion information signaled for an inter-coded block, then IC parameters a and b can be derived, and prediction refinement can then be performed. The IC parameters can be derived by minimizing the difference between the neighboring reconstructed samples of the current block and the neighboring samples of the reference block used for inter-prediction. In some cases, the minimization can be performed using a linear least squares method and/or any other suitable minimization method.

Figure 6:
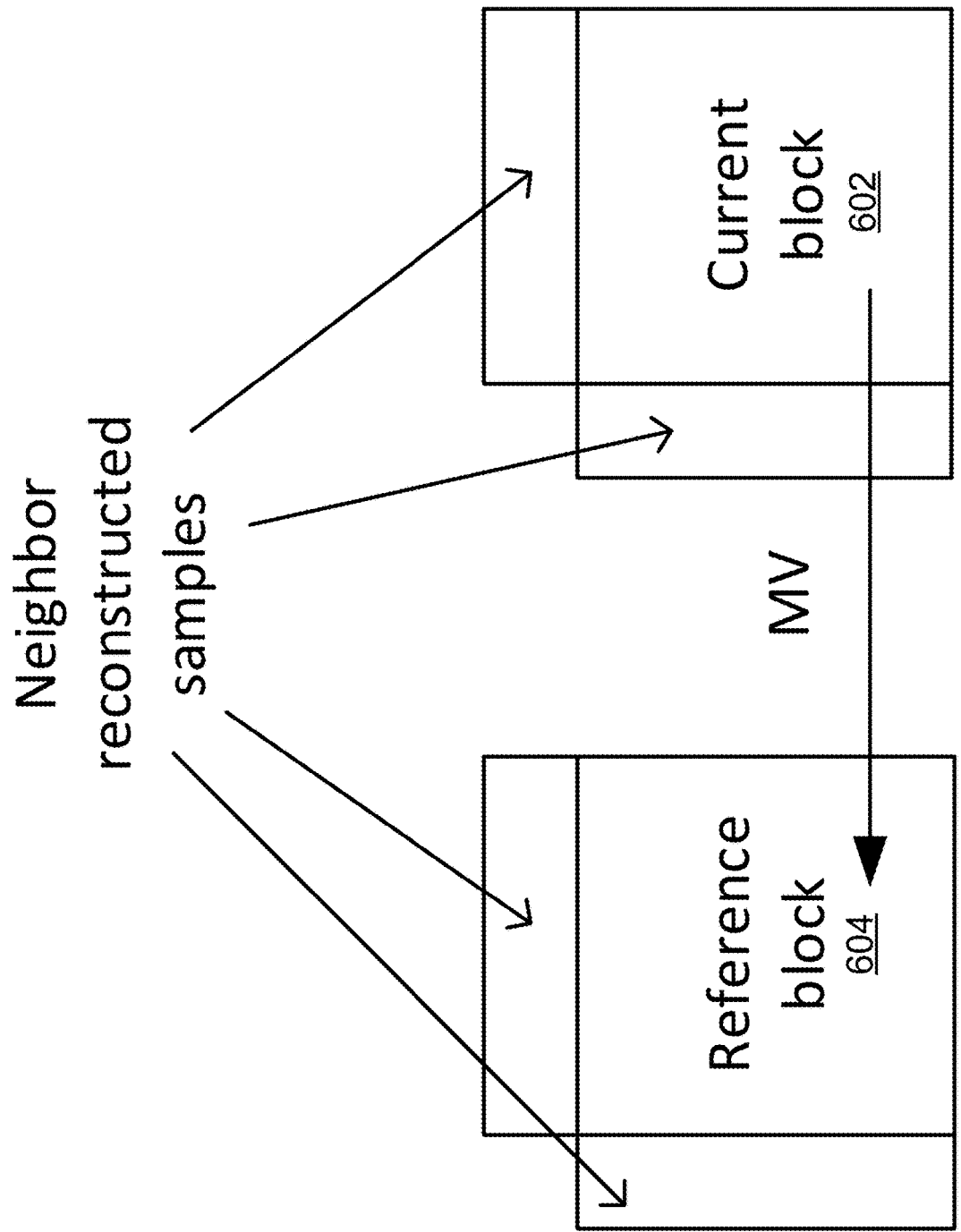
FIG. 6 is a conceptual diagram illustrating an example of neighbor reconstructed samples of a current block and neighbor samples of a reference block used for uni-directional inter-prediction, in accordance with some examples.

FIG. 6 is a diagram illustrating an example of neighbor reconstructed samples of a current block 602 and neighbor samples of a reference block 604 used for uni-directional inter-prediction. A motion vector MV can be coded for the current block 602, where the MV can include a reference index to a reference picture list and/or other motion information for identifying the reference block 604. For example, the MV can include a horizontal and a vertical component that provides an offset from the coordinate position in the current picture to the coordinates in the reference picture identified by the reference index.

Figure 7:
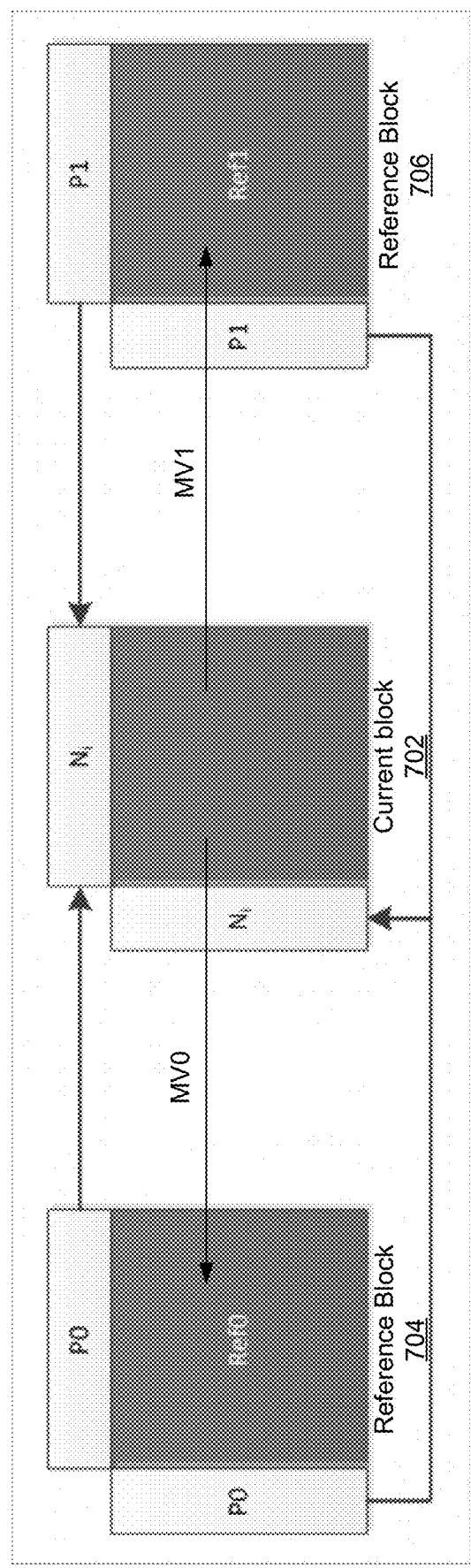
FIG. 7 is a conceptual diagram illustrating an example of neighbor reconstructed samples of a current block and neighbor samples of two reference blocks used for bi-directional inter-prediction, in accordance with some examples.

FIG. 7 is a diagram illustrating an example of neighbor reconstructed samples of a current block 702 and neighbor samples of a first reference block 704 and a second reference block 706 used for bi-directional inter-prediction. In this case, two motion vectors MV0 and MV1 can be coded for the current block 702 to identify the first reference block 704 and a second reference block 706, respectively.

As described above, IC parameters can include one or more offsets (e.g., offset b), one or more weights or scaling factors (e.g., scaling factor a), a shift number, and/or other suitable illumination compensation parameters. IC parameters can be derived for inter-prediction (e.g., uni-directional inter-prediction). For bi-directional inter-prediction, the one or more weights can include a first weight for the first reference picture and a second weight for the second reference picture.

In some implementations, a linear least square regression can be used to estimate the IC parameters in bi-predictive motion compensation. In one example, the derivation of the IC parameters can be performed by solving a cost function.

For example, the cost function can include using a least-square function. For instance, a subset of samples from one or more neighboring blocks of the current block can be used to derive the IC parameters. Samples from neighboring blocks of the current block can be used to find a possible illuminance changes in the current block 702, because it can be assumed that there is a strong correlation between the neighboring samples (in the neighboring blocks) and the current samples (in the current block 702). For instance, it can be assumed that the current block and the neighboring block, which share the same motion information, should contain very similar illuminance values. Another reason to use neighboring samples is that the current block has not yet been predicted, and there may not be pixels to use from the current block, in which case the neighboring samples (which have been reconstructed) can be used in performing the motion compensation of the current block.

In one illustrative example, either a top neighbor, a left neighbor, or both top neighbor and the left neighbor may be used. For instance, after subsampling, a subset of samples from a top neighbor and a left neighbor (Ni) for the current block 702, a subset of pixels from a top neighbor and a left neighbor (P0) of the first reference block 704, and a subset of pixels from a top neighbor and a left neighbor (P1) of the second reference block 706 can be used in deriving the IC parameters for the current block 702. The samples of the neighboring blocks P0 and P1 can include samples corresponding to the neighboring samples of the neighboring blocks Ni. In some cases, the corresponding samples used in the neighboring blocks P0 and P1 can be identified by motion information of the current block. In one illustrative example, the motion vectors can be signaled through either the merge mode or the AMVP mode. The reference pictures can be identified using their reference indexes, the reference blocks 704 and 706 within the reference pictures using the motion vectors MV0 and MV1, respectively.

In some examples, more than one derivation method to derive the IC parameters can be performed. An example of an inter-prediction engine or module for deriving the IC parameters at the encoder side can include the prediction processing unit 41, the motion estimation unit 42, and/or the motion compensation unit 44 shown in FIG. 11. An example of an inter-prediction engine or module for deriving the IC parameters at the decoder side can include the prediction processing unit 81 and/or the motion compensation unit 82 shown in FIG. 11. In such examples, the encoder or other transmitter-side device can signal to the decoder which derivation method is to be used at a sequence level (e.g., in the VPS and/or the SPS), at the picture level (e.g., in the PPS), at the slice level (e.g., in the slice header), at the CTU level, at CU level, at PU level, or a combination thereof, or other suitable signaling level.

In some examples, the least square solution can be calculated based on multiple lines and/or columns of a neighbor (e.g., either top neighbor, a left neighbor, both the top and left neighbors, or other neighbors). Example numbers (and in some cases, the typical numbers) of lines and/or columns includes one, two, four, or any other suitable number of rows and/or columns. The cost functions mentioned above may be modified when multiple lines and/or columns of the neighboring block are used. For example, if the blocks are 16×16 blocks (16 rows of pixels by 16 columns of pixels), and if two lines from the top neighboring block and two columns from the left neighboring block are used, the neighboring block $N_i$ will include 64 samples (32 samples from the left neighboring block and 32 samples from the top neighboring block). In such an example, the neighbors P0 and P1 will also include 64 samples.

In some cases, integer-positioned samples (or pixels) are used for the derivation of the IC parameters. In some cases, fractional-positioned samples are used for the derivation of the IC parameters. In some cases, integer-positioned samples and fractional-positioned samples can both be used. For example, the true displacements of moving objects between pictures are continuous and tend to not follow the sampling grid of the pictures in a video sequence. Because of this, fractional accuracy can be used for motion vectors instead of integer accuracy, leading to a decrease in residual error and an increase in coding efficiency of video coders. If a motion vector has a fractional value, the reference block needs to be interpolated accordingly. For example, a motion vector for a sample of a current block can point to a fractional-pel position in a reference block. A fractional-pel position refers to samples (e.g., a luma sample) at fractional sample locations (non-integer locations) in the block. Such locations need to be generated by interpolation. In one example when factional-positioned samples are used, an interpolated or filtered version of the reference block neighbors (e.g., P0 or P1) can be used to reduce the quantization error from the reconstructed pixels when deriving the LIC parameters. Such an interpolated version of a template can be generated using one or more interpolation filters.

In some examples, only the luma component needs to be used to jointly optimize the IC parameters for both Ref0 and Ref1. Alternatively, both luma and chroma components can be considered during the derivation of the bi-predictive LIC parameters. The encoder can signal to the decoder (in a parameter set, in an SEI message, or other suitable signaling mechanism) whether or not to apply LIC to one or more of the chroma components, or only to apply LIC to the luma components.

In some examples, one or more flags can be signaled (e.g., at a block level, slice level, or other suitable level), such as from an encoder to a decoder, to indicate whether particular tools have been applied (e.g., LIC, merge mode, among others) in the prediction of a block. For example, a merge mode flag can be stored with motion information for a current block. Whether the current block has been coded using merge mode can be inferred from the motion information based on the merge mode flag. In addition to the merge mode flag, an illumination compensation (IC) flag can also be used to indicate that a block (e.g., a PU, CU, or other block) has been coded with illumination compensation applied. As noted above, when a block is coded with merge mode, the IC flag can be copied from neighboring blocks, in a way similar to motion information copy in merge mode. Otherwise, if the CU has not been coded with merge mode (e.g., an AMVP mode was used instead), an IC flag can be signalled for the CU to indicate whether LIC applies or not.

As described in the JVET literature (e.g., JVET-K0556), the VVC Test Model (VTM) 3.0 (VTM-3.0) adopts a coding unit (CU) split restriction regarding the concept of a square-shaped virtual pipeline data unit (VPDU). VPDUs are non-overlapping cells in a picture or video frame. For example, VPDUs can be non-overlapping M×M-luma(L)/N×N-chroma(C) units in a picture. The VPDU construct includes virtual blocks that are used for memory access (e.g., to determine which area of memory is used for processing a particular block or blocks of data), defining the size of the memory allocated to implement the Standard-based coding process (e.g., HEVC, VVC, or other coding process). The VPDU construct is not a block partitioning mechanism for coding purposes. For instance, in the hardware decoding process, consecutive VPDUs can be processed in parallel by multiple processing/decoding pipeline stages (e.g., different decoding pipeline stages process different VPDUs simultaneously). In some cases, a VPDU size can be roughly proportional to the buffer size in some pipelines. For instance, a VPDU size can be set to the size of a transform block (TB) size. In one illustrative example, the size of a VPDU can be 64×64 samples (e.g., luma samples). In HEVC, the VPDU size is set to maximum transform block size which is 32×32-L (Luma samples) and 16×16-C (Chroma samples). In VVC, the VPDU size is set to 128× 128-L (Luma samples) and 64×64-C(Chroma samples), which results in the request of larger VPDU sizes.

Figure 8:
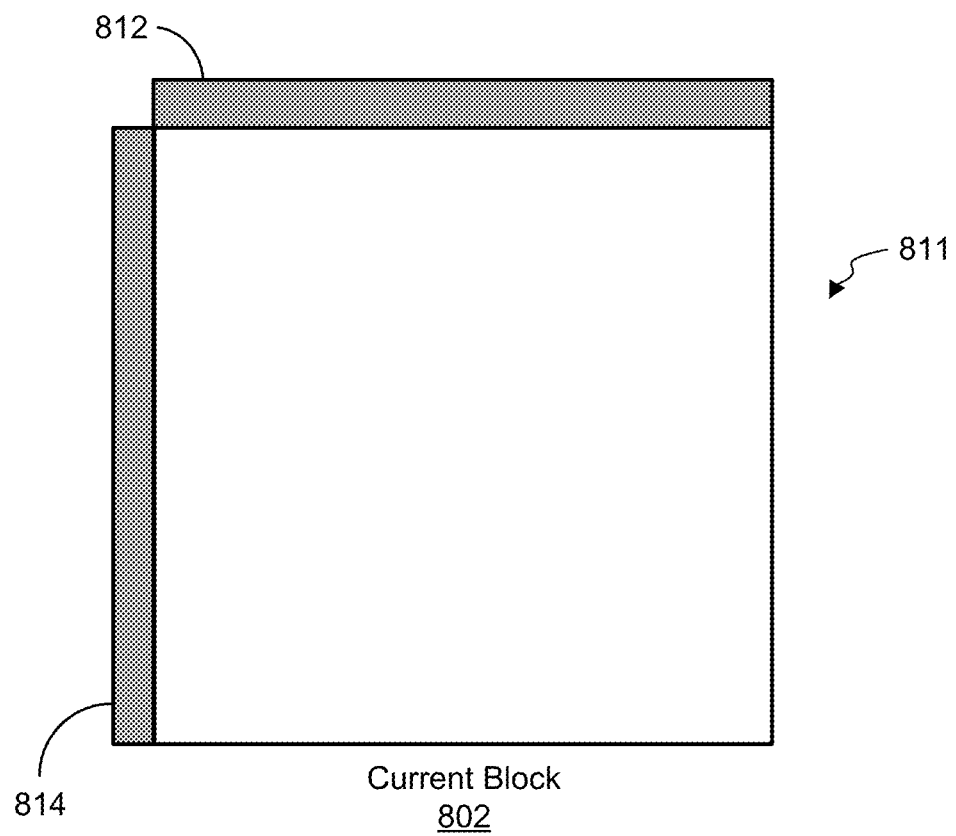
FIG. 8 is a conceptual diagram illustrating an example of a VPDU containing a single block, in accordance with some examples.

A VPDU can contain one or more multiple blocks (e.g., a CU, PU, TU, or other block). For example, in some cases, a single CU can be included in one VPDU (e.g., the size of the CU and the VPDU size are the same). FIG. 8 is a diagram illustrating an example of a VPDU 811 containing a single current block 802. The current block 802 can be a CU, a PU, a TU, or other block of a picture. Also shown in FIG. 8 are top neighboring samples 812 and the left neighboring samples 814 of the current block 802. The top neighboring samples 812 are included in one or more blocks that are immediately above the current block 802. The left neighboring samples 814 are included in one or more blocks that are immediately to the left of the current block 802. The top neighboring samples 812 and the left neighboring samples 814 can be used to perform illumination compensation (IC) for the current block 802, as described above.

Figure 9:
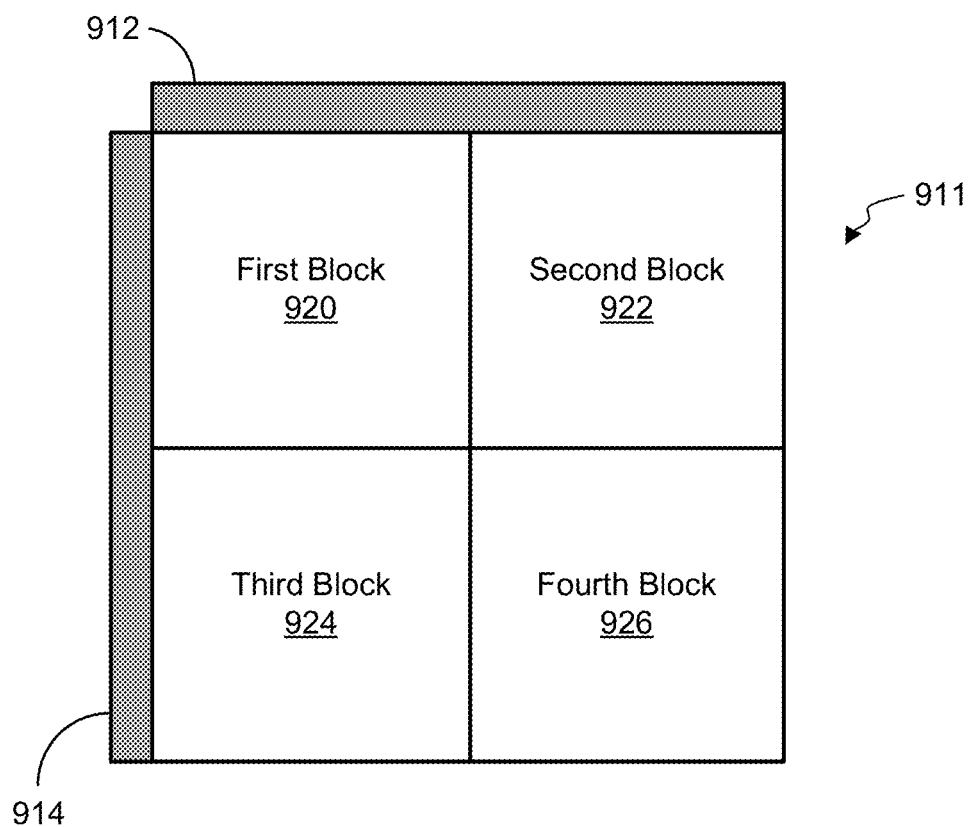
FIG. 9 is a conceptual diagram illustrating an example of a VPDU containing four blocks, in accordance with some examples.

In some cases, multiple blocks can be included in one VPDU (e.g., multiple CUs, PUs, TUs, or other blocks having sizes that are smaller than the VPDU size). FIG. 9 is a diagram illustrating an example of a VPDU 911 containing four blocks, including a first block 920, a second block 922, a third block 924, and a fourth block 926. Each of the first block 920, the second block 922, the third block 924, and/or the fourth block 926 can be a CU, a PU, a TU, or other block of a picture. Top neighboring samples 912 and left neighboring samples 914 of the first block 920, the second block 922, the third block 924, and the fourth block 926 are also shown, which can be used for performing IC for the various blocks, as described above.

Depending on the size of a block (e.g., a CU, PU, TU, or other block), the block may or may not span multiple VPDUs (in which case a block may include multiple VPDUs). For example, a block having a size of 128×64 (128 samples wide×64 samples high) can span two VPDUs that each have a size of 64×64. In another example, a block having a size of 128×128 (128 samples wide×128 samples high) can span four VPDUs that each have a size of 64×64. The block can be split into a certain number of sub-blocks for performing inter-prediction by each of the VPDU pipeline stages. For example, a 128×128 block can be split into for 64×64 sub-blocks for processing by four different VPDU pipeline stages. The block can be split for inter-prediction because there is no dependency on neighboring blocks for performing inter-prediction.

Figure 10:
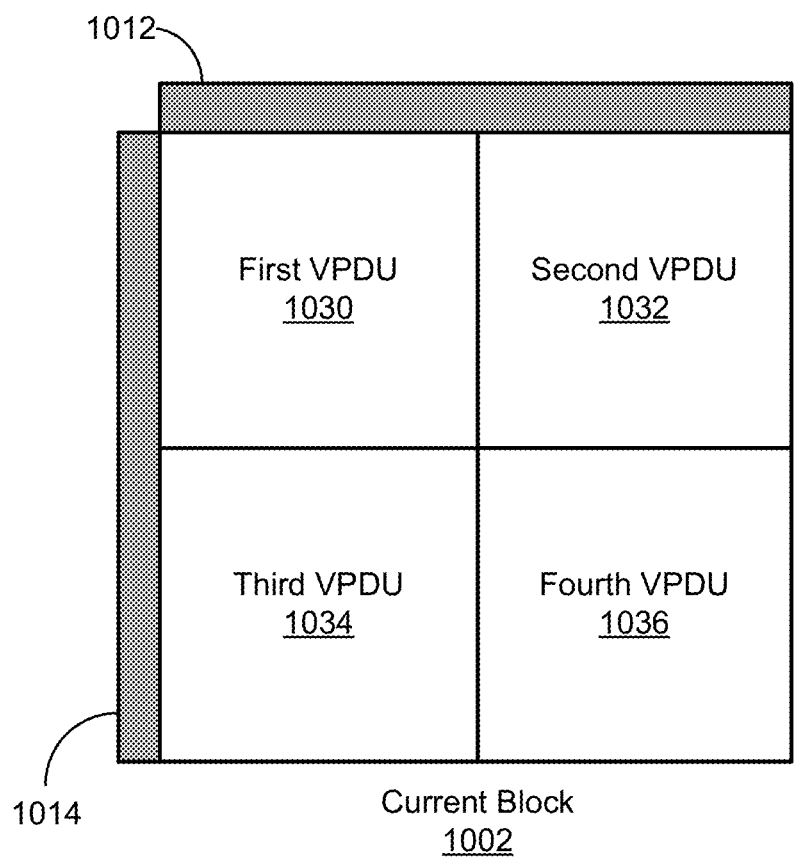
FIG. 10 is a conceptual diagram illustrating an example of current block spanning multiple VPDUs, in accordance with some examples.

FIG. 10 is a diagram illustrating an example of current block 1002 spanning multiple VPDUs. For example, the current block 1002 contains the samples associated with four VPDUs, including a first VPDU 1030, a second VPDU 1032, a third VPDU 1034, and a fourth VPDU 1036. In one illustrative example, the current block 1002 has a size of 128×128, and each of the VPDUs 1030-1034 have a size of 64×64. The current block 1002 can be a CU, a PU, a TU, or other block of a picture. Top neighboring samples 1012 and left neighboring samples 1014 of the current block 1002 are also shown in FIG. 10, which can be used for performing IC for the current block 1002.

Figure 11:
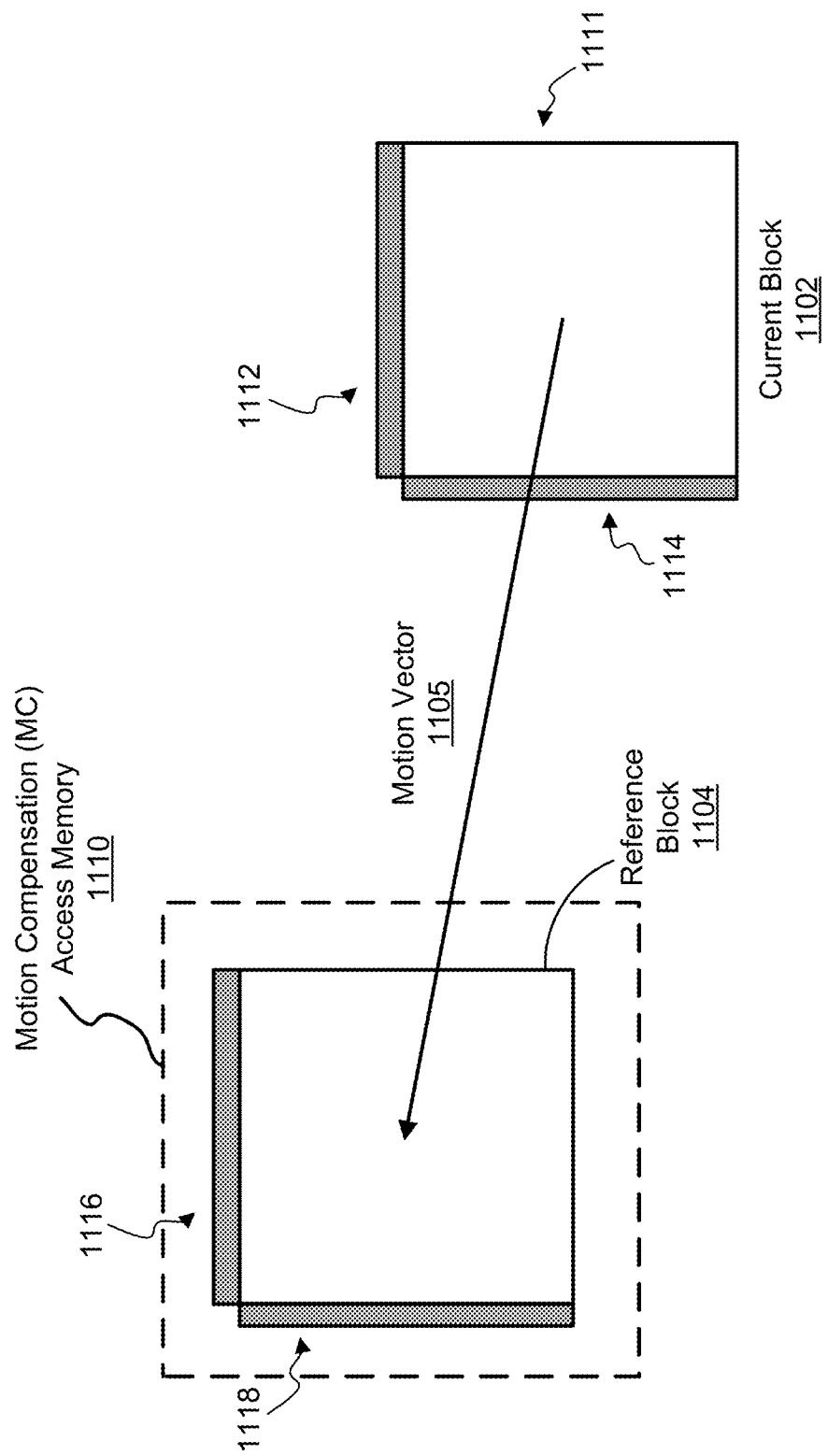
FIG. 11 is a conceptual diagram illustrating an example relationship of the neighboring samples when a block size is inside one virtual pipeline data unit (VPDU), in accordance with some examples.

FIG. 11 is a diagram illustrating the relationship of neighboring samples used for IC when a block is a same size as a VPDU. For example, as shown in FIG. 11, a current block 1102 fits within a VPDU 1111 due to the current block 1102 and the VPDU 1111 being of a same size. The current block 1102 can be a CU, a PU, a TU, or other block of a picture. Top neighboring samples 1112 are included in one or more blocks that are immediately above the current block 1102. Left neighboring samples 1114 are included in one or more blocks that are immediately to the left of the current block 1102. The motion compensation (MC) access memory 1110 is the memory area corresponding to the VPDU containing the reference block for the current block 1102. The top neighboring samples 1116 and the left neighboring samples 1118 of the reference block 1104 are included in the MC access memory 1110 area of the current block 1102. The top neighboring samples 1116 are included in one or more blocks that are immediately above the reference block 1104, and the left neighboring samples 1118 are included in one or more blocks that are immediately to the left of the reference block 1104. Using the IC techniques described above, the top neighboring samples 1112 and the left neighboring samples 1114 of the current block 1102, as well as the top neighboring samples 1116 and the left neighboring samples 1118 of the reference block 1104, can be used to perform IC for the current block 1102.

Because the top neighboring samples 1116 and the left neighboring samples 1118 of the reference block 1104 are included in the MC access memory 1110 area, there is no additional impact to the memory bandwidth when IC is performed using the top neighboring samples 1116 and the left neighboring samples 1118, and thus there is no increase in the number of VPDU pipeline stage cycles that are needed to perform IC for the current block 1102.

Figure 12:
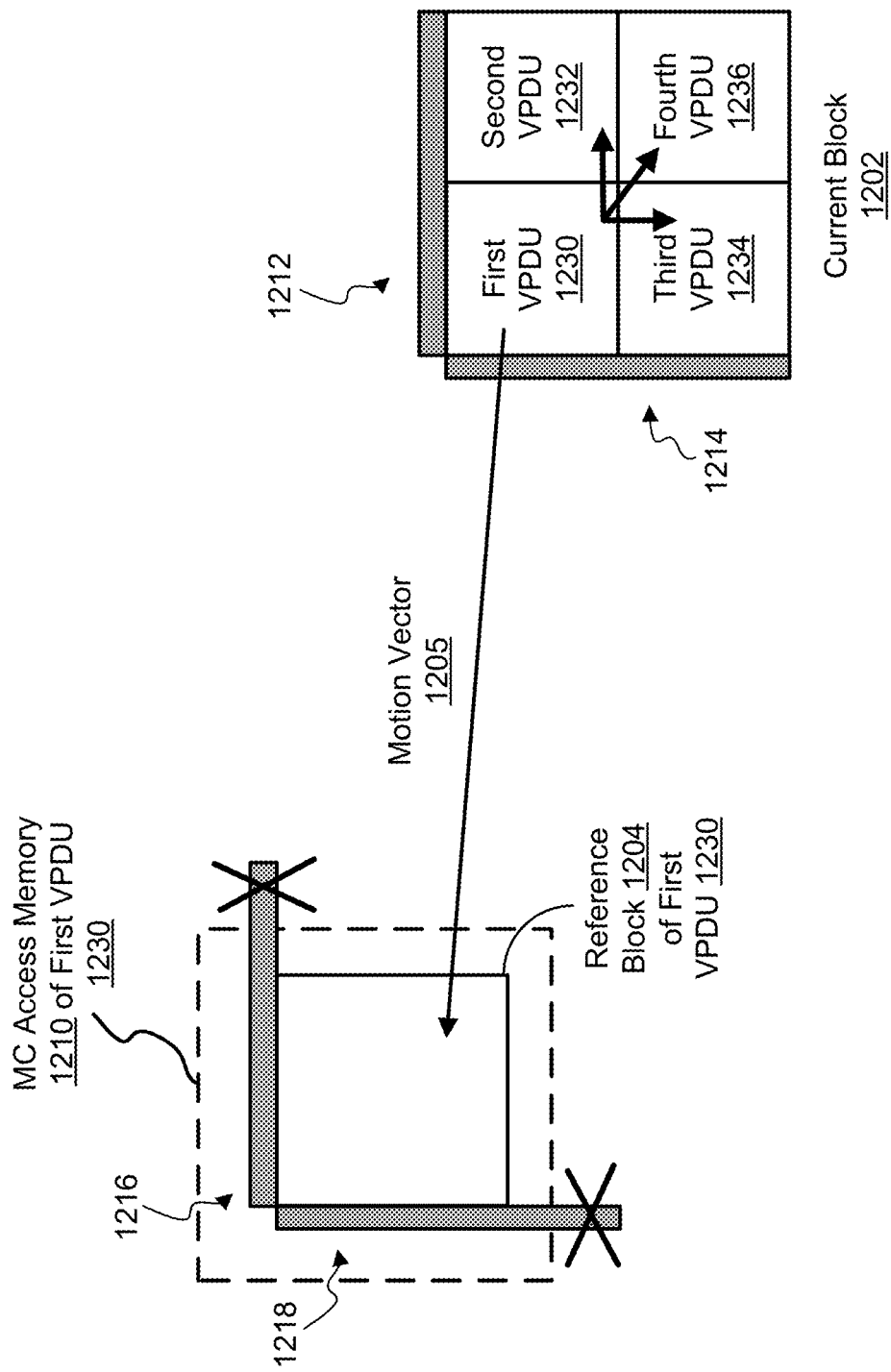
FIG. 12 is a conceptual diagram illustrating an example relationship of the neighboring samples when a block covers more than one VPDU, in accordance with some examples.

As noted above, a block (e.g., a CU, PU, or other block) can be split into a certain number of sub-blocks (e.g., by a decoding device) for performing inter-prediction by each of the VPDU pipeline stages because there is no dependency on neighboring blocks for performing inter-prediction. However, because IC uses neighboring blocks to determine IC parameters, there is a dependency on neighboring blocks when IC is used along with inter-prediction. Additional VPDU processing pipelines may thus be needed when performing IC. For example, when a block covers more than one VPDU, such as the example illustrated in FIG. 10, neighboring samples used for IC parameter calculation for the block (e.g., for calculating one or more offsets b and/or one or more weights or scaling factors a) lead to the need for additional memory access and to increased bandwidth usage. FIG. 12 shows the relationship of the neighboring samples when a block covers more than one VPDU. For example, a current block 1202 includes the samples associated with four VPDUs, including a first VPDU 1230, a second VPDU 1232, a third VPDU 1234, and a fourth VPDU 1236. The current block 1202 can be a CU, a PU, a TU, or other block of a picture. Top neighboring samples 1212 (from one or more blocks immediately above the current block 1102) and left neighboring samples 1214 (from one or more blocks immediately to the left of the current block 1102) are also shown.

The MC access memory 1210 is the memory area corresponding to the first VPDU 1230 (e.g., the MC access memory 1210 area stores the samples that are assigned to the first VPDU 1230). The MC access memory 1210 area of the first VPDU 1230 includes samples from the neighboring area around the reference block 1204 of the first VPDU 1230. For example, as shown in FIG. 12, the top neighboring samples 1216 (from one or more blocks immediately above the reference block 1204) and the left neighboring samples 1218 (from one or more blocks immediately to the left of the reference block 1204) of the reference block 1204 of the first VPDU 1230 are included in the MC access memory 1210 area of the first VPDU 1230. However, as indicated by the two "X's" in FIG. 12, the MC access memory 1210 area of the first VPDU 1230 does not include reference samples from the neighboring area around reference blocks of the second VPDU 1232, the third VPDU 1234, or the fourth VPDU 1236. However, these reference samples may be needed to determine the IC parameters required to perform IC for the current block 1202 (e.g., when IC requires all neighboring samples from a top neighboring block of the current block 1202 and all neighboring samples from a left neighboring block of the current block 1202). Therefore, some of the neighboring samples used for performing IC parameter calculation for the current block 1202 require additional memory access and increase the bandwidth of the processing stage associated with the first VPDU 1230 by requiring the use of the pipeline stages associated with the second VPDU 1232 and the third VPDU 1234.

Figure 13:
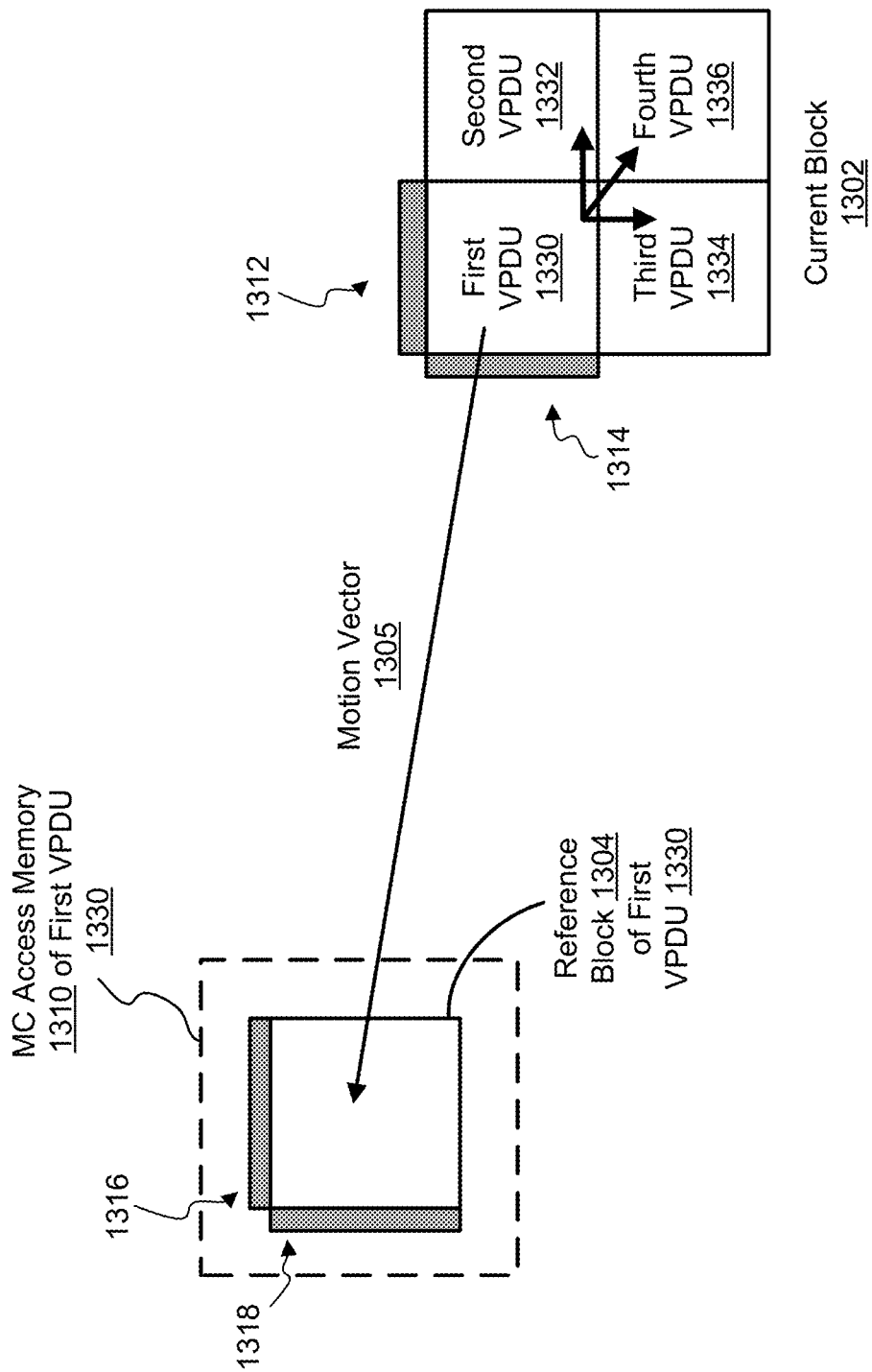
FIG. 13 is a conceptual diagram illustrating a proposed local illumination compensation (LIC) method for a VPDU split process using only the top and left neighboring samples of a VPDU for both the current block and the reference block, in accordance with some examples.

In some cases, only the top and left neighboring samples of a first VPDU of both the current block and the reference block of the current block are used to determine IC parameters for a current block, which was discussed in JVET-M0088. FIG. 13 is a diagram illustrating an example of such a case. For example, a current block 1302 includes the samples associated with a first VPDU 1330, a second VPDU 1332, a third VPDU 1334, and a fourth VPDU 1336. The current block 1302 can be a CU, a PU, a TU, or other block of a picture. Top neighboring samples 1312 from one or more blocks immediately above the first VPDU 1330 and left neighboring samples 1314 from one or more blocks immediately to the left of the first VPDU 1330 are also shown. The top neighboring samples 1312 can include a row of samples from a block that is immediately above the first VPDU 1330 (e.g., a bottom-most row of samples from the top neighboring block above the current block 1302, where the bottom-most row of samples is adjacent to a top-most row of samples in the current block 1302). The left neighboring samples 1314 can include a column of samples from a block that is immediately to the left of the first VPDU 1330 (e.g., a right-most column of samples from the left neighboring block to the left of the current block 1302, where the right-most column of samples is adjacent to a left-most column of samples in the current block 1302).

As noted above in the example of FIG. 12, the MC access memory 1310 area of the first VPDU 1330 includes samples from the neighboring one or more blocks adjacent to the reference block 1304 of the first VPDU 1330, including for example the top neighboring samples 1316 and the left neighboring samples 1318 of the reference block 1304 of the first VPDU 1330. Using the technique described in JVET-M0088, the top neighboring samples 1316 and the left neighboring samples 1318 of the reference block 1304 of the first VPDU 1330 and the top neighboring samples 1312 and the left neighboring samples 1314 of the first VPDU 1330 are used to calculate IC parameters for the current block 1302. Using such a technique, neighboring samples of the second VPDU 1332, the third VPDU 1334, and the fourth VPDU 1336 included in the current block 1302 and the neighboring samples of the reference blocks of the VPDUs 1332, 1334, and 1336 are not used to calculate the IC parameters for the current block 1302. In such cases, the first VPDU 1330 shares the calculated IC parameter with the second VPDU 1332, the third VPDU 1334, and the fourth VPDU 1336 in the current block 1302. For example, the pipeline stages used for coding the samples associated with the second VPDU 1332, the third VPDU 1334, and the fourth VPDU 1336 can use the IC parameters determined by the pipeline stage used for coding the samples associated with the first VPDU 1330. However, using only the top neighboring samples and the left neighboring samples of the first VPDU 1330 of both the current block 1302 and the reference block 1304 may reduce the coding performance of IC because less neighbouring samples are used for determining the IC parameters for the entire block 1302.

Systems, methods, and computer-readable media are described herein for improving illumination compensation. The techniques described herein can be performed individually or in any combination.

In some examples, techniques are described for disabling IC (e.g., local illumination compensation (LIC)) for a block that covers more than one VPDU (e.g., a plurality a VPDUs). For example, if the size of a VPDU is 64×64 (64 samples×64 samples), then LIC is disabled for blocks with a width larger than 64 samples and/or a height larger than 64 samples (corresponding to a block that covers more than one 64×64 VPDU). In such examples, for a block that covers more than one VPDU, the LIC flag may not be signalled and can be inferred (e.g., during a decoding process by a decoder, an encoder or other device or component) to have a value of 0 (indicating LIC is not performed for that block).

In some examples, techniques are described for selectively using certain samples for coding (e.g., for performing LIC). For example, if a block covers more than one VPDU, in addition to using the top and left neighboring samples of a VPDU of both a current block and a reference block of the current block, additional neighbor samples can be used for determining illumination compensation (IC) parameters for the current block.

In some cases, subsampling (also referred to as downsampling) is not applied to neighboring samples (e.g., the top neighboring samples and/or the left neighboring samples) of a first VPDU of either (or both in some cases) the current block and the reference block, as is done in the examples described above with respect to FIG. 5A—FIG. 7. For instance, referring to FIG. 13, a coding device (e.g., the encoding device 104 and/or the decoding device 112) can determine that the current block 1302 covers more than one VPDU (the first VPDU 1330, the second VPDU 1332, the third VPDU 1334, and the fourth VPDU 1336). In response to determining the current block 1302 covers more than one VPDU, the coding device can determine to calculate IC parameters for the current block 1302 using the top neighboring samples 1316 and the left neighboring samples 1318 of the reference block 1304 of the first VPDU 1330 and the top neighboring samples 1312 and the left neighboring samples 1314 of the first VPDU 1330. Further in response to determining the current block 1302 covers more than one VPDU, the coding device can determine not to perform subsampling to the top neighboring samples 1316 of the reference block 1304 of the first VPDU 1330, the left neighboring samples 1318 of the reference block 1304, the top neighboring samples 1312 of the first VPDU 1330, and/or the left neighboring samples 1314 of the first VPDU 1330. By determining not to perform subsampling, more samples will be used for determining the IC parameters for the current block 1302.

In another implementations, in addition to or as an alternative to determining not to perform subsampling for neighboring samples, additional neighbor samples from more lines and/or columns of the top neighboring samples and/or left neighboring samples of a VPDU of either or both the current and the reference blocks can be used, if those additional neighboring samples are available. In some cases, the additional neighbor samples can include samples from an additional row of samples from a neighboring block of the VPDU included in a current block, an additional column of samples from the neighboring block of the VPDU, an additional row of samples from the neighboring block of the reference block of the current block, an additional column of samples from the neighboring block of the reference block, samples from a neighboring block of an additional VPDU included in the current block, or any combination thereof.

For instance, assuming the top neighboring samples of a first VPDU of the current block include a first row of samples from a top neighboring block that is immediately above the first VPDU, the left neighboring samples of the first VPDU include a first column of samples from a left neighboring block that is immediately to the left of the first VPDU, the top neighboring samples of a first reference block of the first VPDU include a first row of samples from a top neighboring block that is immediately above the reference block, and the left neighboring samples of the first reference block of the first VPDU include a first column of samples from a left neighboring block that is immediately to the left of the reference block, the additional neighbor samples can include samples from a second row of samples from the top neighboring block of the first VPDU, a second column of samples from the left neighboring block of the first VPDU, a second row of samples from the top neighboring block of the reference block, a second column of samples from the left neighboring block of the reference block, samples from a neighboring block of a second VPDU included in the current block, or any combination thereof.

Figure 14:
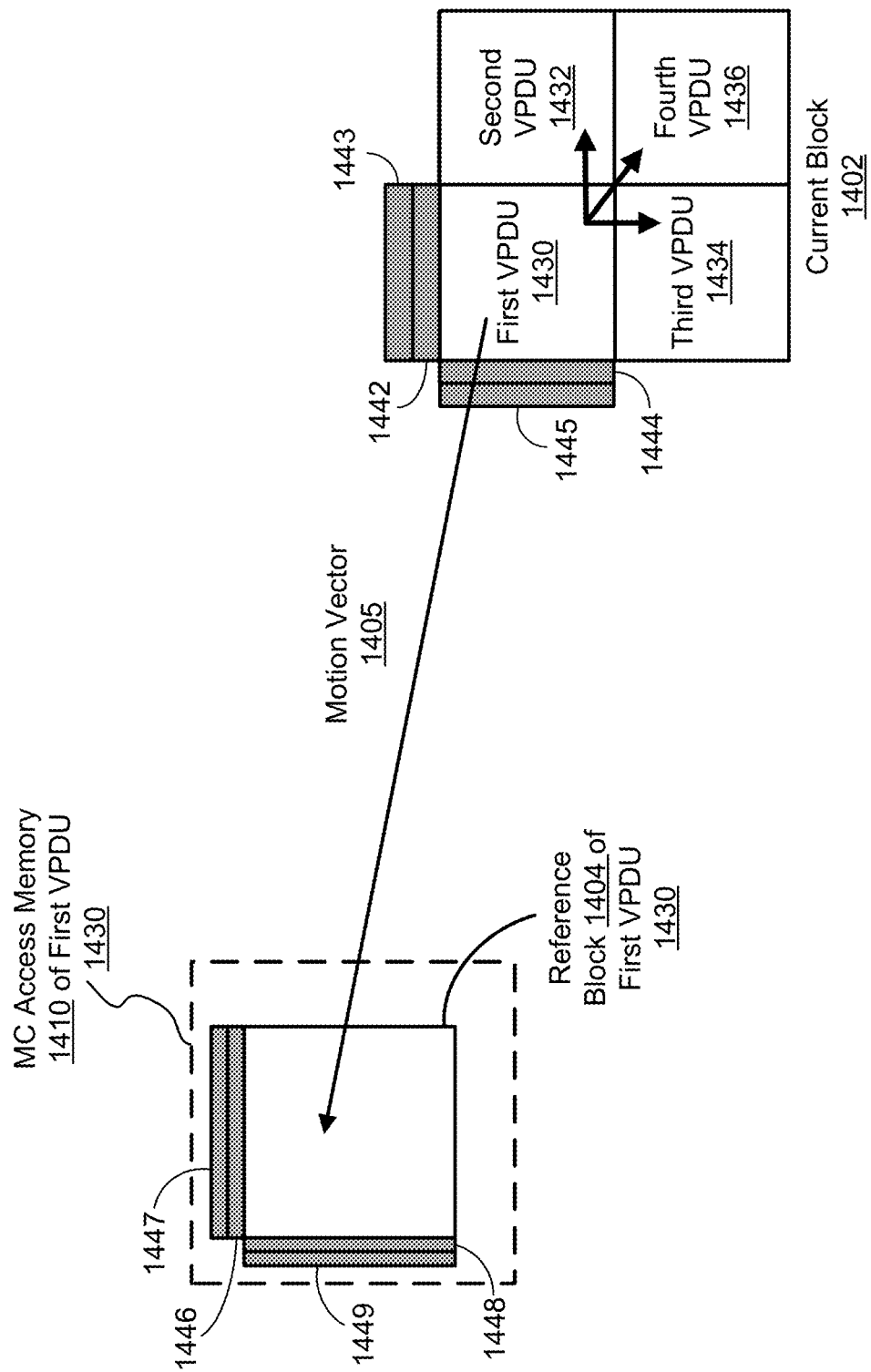
FIG. 14 is a conceptual diagram illustrating an example of performing LIC using multiples lines and columns of samples around a VPDU and a reference block of the VPDU, in accordance with some examples.

FIG. 14 is a diagram illustrating an example of determining IC parameters for a current block 1402 using multiple rows (or lines) of samples from a top neighboring block (or multiple top neighboring blocks) and multiple columns of samples from a left neighboring block (or multiple left neighboring blocks) of a first VPDU 1430 of the current block 1402, and using multiple rows of samples from a top neighboring block (or multiple top neighboring blocks) and multiple columns of samples from a left neighboring block (or multiple left neighboring blocks) of a reference block 1404 of the first VPDU 1430. The current block 1402 can be a CU, a PU, a TU, or other block of a picture. The current block 1402 includes multiple VPDUs, including the first VPDU 1430, a second VPDU 1432, a third VPDU 1434, and a fourth VPDU 1436.

As shown in FIG. 14, a first row of samples 1442 from a top neighboring block (or from multiple top neighboring blocks) that is adjacent to the first VPDU 1430 and a second row of samples 1443 from the top neighboring block (or multiple top neighboring blocks) are identified (e.g., by a coding device, such as the encoding device 104 and/or the decoding device 112) for use in determining IC parameters for the current block 1402. The first row of samples 1442 can include a bottom-most row of samples from the top neighboring block above the first VPDU 1430, and can be located immediately above a top-most row of samples in the current block 1402. The second row of samples 1443 can include a row of samples that is immediately above the first row of samples 1442. In addition, a first column of samples 1444 from a left neighboring block (or from multiple left neighboring blocks) that is adjacent to the first VPDU 1430 and a second column of samples 1445 from the left neighboring block (or multiple left neighboring blocks) are determined for use in determining the IC parameters for the current block 1402. The first column of samples 1444 can include a right-most column of samples from the left neighboring block to the left of the first VPDU 1430, and can be located immediately to the left of a left-most column of samples in the current block 1402. The second column of samples 1445 can include a column of samples that is immediately to the left of the first column of samples 1444.

A reference block 1404 of the first VPDU 1430 is located using a motion vector 1405. The motion vector 1405 can be determined using any suitable technique used in inter-prediction (e.g., merge mode, advanced motion vector prediction (AMVP) mode, skip mode, and/or other inter-prediction technique), such as those described herein. The coding device can determine a first row of samples 1446 from a top neighboring block (or from multiple top neighboring blocks) that is adjacent to the reference block 1404 and a second row of samples 1447 from the top neighboring block (or multiple top neighboring blocks) for use in determining the IC parameters for the current block 1402. The first row of samples 1446 can include a bottom-most row of samples from the top neighboring block above the reference block 1404, and can be located immediately above a topmost row of samples in the reference block 1404. The second row of samples 1447 can include a row of samples (in the top neighboring block above the reference block 1404) that is immediately above the first row of samples 1446. The coding device can also determine a first column of samples 1448 from a left neighboring block (or from multiple left neighboring blocks) that is adjacent to the reference block 1404 and a second column of samples 1449 from the left neighboring block (or multiple left neighboring blocks) of the reference block 1404 for use in determining the IC parameters for the current block 1402. The first column of samples 1448 can include a right-most column of samples from the left neighboring block to the left of the reference block 1404, and can be located immediately to the left of a left-most column of samples in the reference block 1404. The second column of samples 1449 can include a column of samples (from the left neighboring block to the left of the reference block 1404) that is located immediately to the left of the first column of samples 1448.

The first row of samples 1442, the second row of samples 1443, the first column of samples 1444, and the second column of samples 1445 neighboring the first VPDU 1430 can be used as $Rec_{neig}$ in Equations (2) and (3) above, and the first row of samples 1446, the second row of samples 1447, the first column of samples 1448, and the second column of samples 1449 neighboring the reference block 1404 can be used as $Rec_{refneig}$ in Equations (2) and (3) above, and/or can be used by another IC parameter derivation technique (e.g., the LIC method proposed in JEM), to determine the IC parameters for the first VPDU 1430. In some cases, the first VPDU 1430 can share the calculated IC parameter with the second VPDU 1432, the third VPDU 1434, and the fourth VPDU 1436 in the current block 1402. For example, the pipeline stages used for coding the samples associated with the second VPDU 1432, the third VPDU 1434, and the fourth VPDU 1436 can use the IC parameters determined by the pipeline stage used for coding the samples associated with the first VPDU 1430.

As shown in FIG. 14, the MC access memory 1410 area of the first VPDU 1430 includes the first row of samples 1446, the second row of samples 1447, the first column of samples 1448, and the second column of samples 1449 neighboring the reference block 1404. Because the first row of samples 1446, the second row of samples 1447, the first column of samples 1448, and the second column of samples 1449 neighboring the reference block 1404 are included in the MC access memory 1410 area associated with the first VPDU 1430, there is no additional impact to the memory bandwidth when IC is performed using these samples. Thus, the additional samples can be used to determine IC parameters for the current block 1402 without any increase in the number of VPDU pipeline stage cycles but with better coding performance of IC, such as when compared to the number of VPDU pipeline stage cycles used and the IC performance achieved when using the technique described in JVET-M0088 is performed. For instance, better IC performance is achieved as compared to the JVET-M0088 technique because more samples are used to derive the IC parameters using the example shown in FIG. 14.

While the example of FIG. 14 is shown to include the first row of samples 1442, the second row of samples 1443, the first column of samples 1444, and the second column of samples 1445 neighboring the first VPDU 1430, a coding device can determine to use any sub-combination of these samples for determining IC parameters for the current block 1402. For example, the coding device can determine to use the first row of samples 1442, the second row of samples 1443, and the first column of samples 1444. In another example, the coding device can determine to use the first row of samples 1442, the first column of samples 1444, and the second column of samples 1445 neighboring the first VPDU 1430 for determining IC parameters for the current block 1402. Similarly, while the example of FIG. 14 is shown to include the first row of samples 1446, the second row of samples 1447, the first column of samples 1448, and the second column of samples 1449 neighboring the reference block 1404, the coding device can determine to use any sub-combination of the samples for determining IC parameters for the current block 1402, such as the first row of samples 1446, the second row of samples 1447, and the first column of samples 1448. In another example, the coding device can determine to use the first row of samples 1446, the first column of samples 1448, and the second column of samples 1449 neighboring the reference block 1404 for determining IC parameters for the current block 1402. In yet another example, the coding device can determine to use, for determining IC parameters for the current block 1402, the first row of samples 1442, the second row of samples 1443, the first column of samples 1444, and the second column of samples 1445 neighboring the first VPDU 1430, and the first row of samples 1446 and the first column of samples 1448 neighboring the reference block 1404. In another example, the coding device can determine to use the first row of samples 1442 and the first column of samples 1444 neighboring the first VPDU 1430, and the first row of samples 1446, the second row of samples 1447, the first column of samples 1448, and the second column of samples 1449 neighboring the reference block 1404 for determining IC parameters for the current block 1402. One of ordinary skill will appreciate that other combinations of the first row of samples 1442 and the first column of samples 1444 neighboring the first VPDU 1430, the first row of samples 1446 and the first column of samples 1448 neighboring the reference block 1404, and any of the additional samples (e.g., the second row of samples 1443 neighboring the first VPDU 1430, and/or the second row of samples 1447 and/or the second column of samples 1449 neighboring the reference block 1404) can be used by a coding device to determine IC parameters for the current block 1402.

Figure 15:
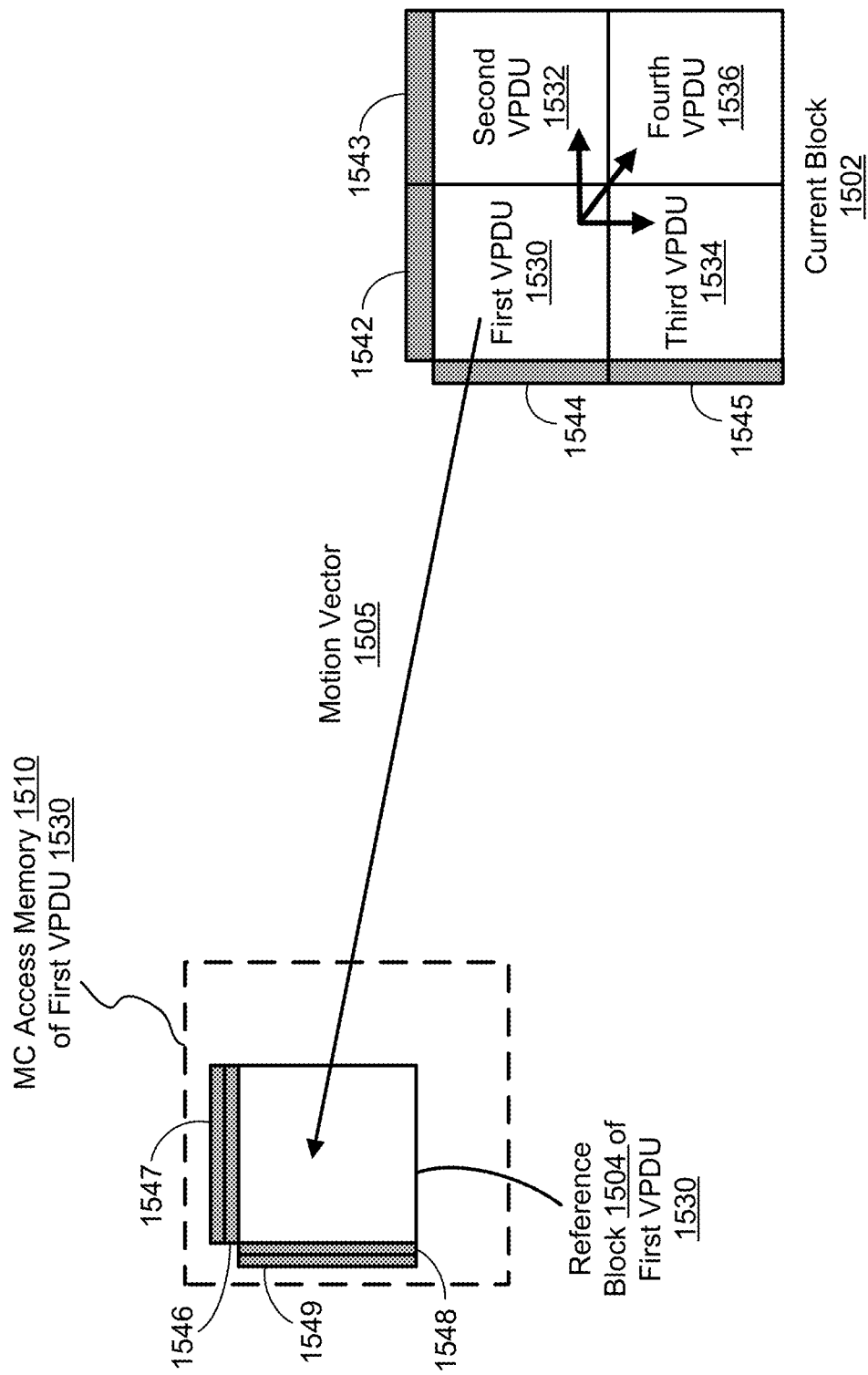
FIG. 15 is a conceptual diagram illustrating an example of performing LIC using multiple lines and columns of samples around the reference block of a VPDU and using top and left neighboring samples around the current block, in accordance with some examples.

FIG. 15 is a diagram illustrating an example of determining samples for use in calculating IC parameters for a current block 1502. The current block 1502 can be a CU, a PU, a TU, or other block of a picture. The current block 1502 includes multiple VPDUs, including a first VPDU 1530, a second VPDU 1532, a third VPDU 1534, and a fourth VPDU 1536. In the example of FIG. 15, the IC parameters can be determined for the current block 1502 using at least one row and at least one column of samples neighboring a first VPDU 1530 and at least one row and at least one column of samples neighboring additional VPDUs (including a second VPDU 1532 and a third VPDU 1534) of the current block 1502, and using multiple rows of samples from a top neighboring block (or multiple top neighboring blocks) and multiple columns of samples from a left neighboring block (or multiple left neighboring blocks) of a reference block 1504 of the first VPDU 1530.

A coding device (e.g., the encoding device 104 and/or the decoding device 112) can identify, for use in determining the IC parameters for the current block 1502, a first row of samples 1542 from a top neighboring block (or from multiple top neighboring blocks) that is adjacent to the first VPDU 1530 and a second row of samples 1543 from the top neighboring block (or multiple top neighboring blocks) or from an additional top neighboring block (or from additional multiple top neighboring blocks) adjacent to the second VPDU 1532. In some cases, the first row of samples 1542 and the second row of samples 1543 can be from a same top neighboring block that is adjacent to the first VPDU 1530 and the second VPDU 1532. For instance, a bottom-most row of the top neighboring block above the first VPDU 1530 and the second VPDU 1532 can include the first row of samples 1542 and the second row of samples 1543, which can be located immediately above a top-most row of samples in the current block 1502. In some cases, the first row of samples 1542 can be from a first top neighboring block and the second row of samples 1543 can be from a second top neighboring block that is different from the first top neighboring block, in which case the first top neighboring block is adjacent to the first VPDU 1530 and the second top neighboring block is adjacent to the second VPDU 1532. For instance, a bottom-most row of the first top neighboring block above the first VPDU 1530 can include the first row of samples 1542 and can be located immediately above the top-most row of samples in the current block 1502. In such cases, a bottom-most row of the second top neighboring block above the second VPDU 1532 can include the second row of samples 1543 and can be located immediately above the top-most row of samples in the current block 1502.

The coding device can also determine, for use in determining the IC parameters for the current block 1502, a first column of samples 1544 from a left neighboring block (or from multiple left neighboring blocks) that is adjacent to the first VPDU 1530 and a second column of samples 1545 from the left neighboring block (or multiple left neighboring blocks) or from an additional left neighboring block (or from additional multiple left neighboring blocks) adjacent to the third VPDU 1534. In some cases, the first column of samples 1544 and the second column of samples 1545 can be from a same left neighboring block that is adjacent to the first VPDU 1530 and the third VPDU 1534. For example, a right-most column of the left neighboring block to the left of the first VPDU 1530 and the third VPDU 1534 can include the first column of samples 1544 and the second column of samples 1545, which can be located immediately to the left of a left-most column of samples in the current block 1502. In some cases, the first column of samples 1544 can be from a first left neighboring block and the second column of samples 1545 can be from a second left neighboring block that is different from the first left neighboring block, in which case the first left neighboring block is adjacent to the first VPDU 1530 and the second left neighboring block is adjacent to the third VPDU 1534. For instance, a right-most column of the first left neighboring block to the left of the first VPDU 1530 can include the first column of samples 1544 and can be located immediately to the left of the left-most column of samples in the current block 1502. In such cases, a right-most column of the second left neighboring block to the left of the third VPDU 1534 can include the second column of samples 1545 and can be located immediately to the left of the left-most column of samples in the current block 1502.

The coding device can determine a reference block 1504 of the first VPDU 1530, which can be located using a motion vector 1505. The motion vector 1505 can be determined using any suitable technique used in inter-prediction (e.g., merge mode, advanced motion vector prediction (AMVP) mode, skip mode, and/or other inter-prediction technique), such as those described herein. The coding device can determine, for use in determining the IC parameters for the current block 1502, a first row of samples 1546 from a top neighboring block (or from multiple top neighboring blocks) that is adjacent to the reference block 1504 and a second row of samples 1547 from the top neighboring block (or multiple top neighboring blocks). The first row of samples 1546 can include a bottom-most row of samples from the top neighboring block above the reference block 1504. For example, the first row of samples 1546 can be located immediately above a top-most row of samples in the reference block 1504. The second row of samples 1547 can include a row of samples (in the top neighboring block above the reference block 1504) that is immediately above the first row of samples 1546. The coding device can also determine a first column of samples 1548 from a left neighboring block (or from multiple left neighboring blocks) that is adjacent to the reference block 1504 and a second column of samples 1549 from the left neighboring block (or multiple top neighboring blocks) of the reference block 1504 for use in determining the IC parameters for the current block 1502. The first column of samples 1548 can include a right-most column of samples from the left neighboring block to the left of the reference block 1504, and can be located immediately to the left of a left-most column of samples in the reference block 1504. The second column of samples 1549 can include a column of samples (from the left neighboring block to the left of the reference block 1504) that is located immediately to the left of the first column of samples 1548.

The first row of samples 1542 and the first column of samples 1544 neighboring the first VPDU 1530, the second row of samples 1543 neighboring the second VPDU 1532, and the second column of samples 1545 neighboring the third VPDU 1534 can be used as $Rec_{neig}$ in Equations (2) and (3) above, and the first row of samples 1546, the second row of samples 1547, the first column of samples 1548, and the second column of samples 1549 neighboring the reference block 1504 can be used as $Rec_{refneig}$ in Equations (2) and (3) above, and/or can be used by any other IC parameter derivation technique (e.g., the LIC method proposed in JEM) to determine the IC parameters for the first VPDU 1530. As described above, the first VPDU 1530 can share the calculated IC parameter with the second VPDU 1532, the third VPDU 1534, and the fourth VPDU 1536 in the current block 1502.

Similar to that described with respect to FIG. 14, the MC access memory 1510 area of the first VPDU 1530 shown in FIG. 15 includes the first row of samples 1546, the second row of samples 1547, the first column of samples 1548, and the second column of samples 1549 neighboring the reference block 1504, and thus there is no additional impact to the memory bandwidth when IC is performed using these samples. The additional samples can be used to determine IC parameters for the current block 1502 without any increase in the number of VPDU pipeline stage cycles and with better coding performance of IC because more samples are used to derive the IC parameters, such as when compared to the number of VPDU pipeline stage cycles used and the IC performance achieved by using the JVET-M0088 technique.

While the example of FIG. 15 is shown to include the first row of samples 1542, the second row of samples 1543, the first column of samples 1544, and the second column of samples 1545 neighboring the first VPDU 1530, the second VPDU 1532, and the third VPDU 1534, respectively, a coding device can determine to use any sub-combination of these samples for determining IC parameters for the current block 1502. For example, the coding device can determine to use the first row of samples 1542, the second row of samples 1543, and the first column of samples 1544 for determining IC parameters for the current block 1502. In another example, the coding device can determine to use the first row of samples 1542, the first column of samples 1544, and the second column of samples 1545 for determining IC parameters for the current block 1502. While the example of FIG. 15 is also shown to include the first row of samples 1546, the second row of samples 1547, the first column of samples 1548, and the second column of samples 1549 neighboring the reference block 1504, the coding device can determine to use any sub-combination of the samples for determining IC parameters for the current block 1502. For example, the first row of samples 1546, the second row of samples 1547, and the first column of samples 1548 can be used by the coding device to determine IC parameters for the current block 1502. In another example, the coding device can determine to use the first row of samples 1546, the first column of samples 1548, and the second column of samples 1549 neighboring the reference block 1504 for determining IC parameters for the current block 1502. In yet another example, the coding device can determine to use, for determining IC parameters for the current block 1502, the first row of samples 1542 and the first column of samples 1544 neighboring the first VPDU 1530, the second row of samples 1543 neighboring the second VPDU 1532, and the second column of samples 1545 neighboring the third VPDU 1534, and the first row of samples 1546 and the first column of samples 1548 neighboring the reference block 1504. In another example, the coding device can determine to use the first row of samples 1542 and the first column of samples 1544 neighboring the first VPDU 1530, and the first row of samples 1546, the second row of samples 1547, the first column of samples 1548, and the second column of samples 1549 neighboring the reference block 1504 for determining IC parameters for the current block 1502. It will be appreciated that other combinations of the first row of samples 1542 and the first column of samples 1544 neighboring the first VPDU 1530, the first row of samples 1546 and the first column of samples 1548 neighboring the reference block 1504, and any of the additional samples (e.g., the second row of samples 1543 neighboring the second VPDU 1532, the second column of samples 1545 neighboring the third VPDU 1534, the second row of samples 1547 neighboring the reference block 1504, and/or the second column of samples 1549 neighboring the reference block 1504) can be used by a coding device to determine IC parameters for the current block 1502.

In some examples, if there are additional samples in the MC access memory of a VPDU other than those neighboring the reference block of the VPDU, those additional samples can be used to determine IC parameters for a current block. For instance, if there are additional samples in the MC access memory of the VPDU to the right of a top neighboring row (or line) of samples above the top-most row of samples of the reference block and/or below a left neighboring column of samples to the left of a left-most column of samples of the reference block, one or more of those pixels could be used in addition to corresponding samples neighboring the current block.

Figure 16:
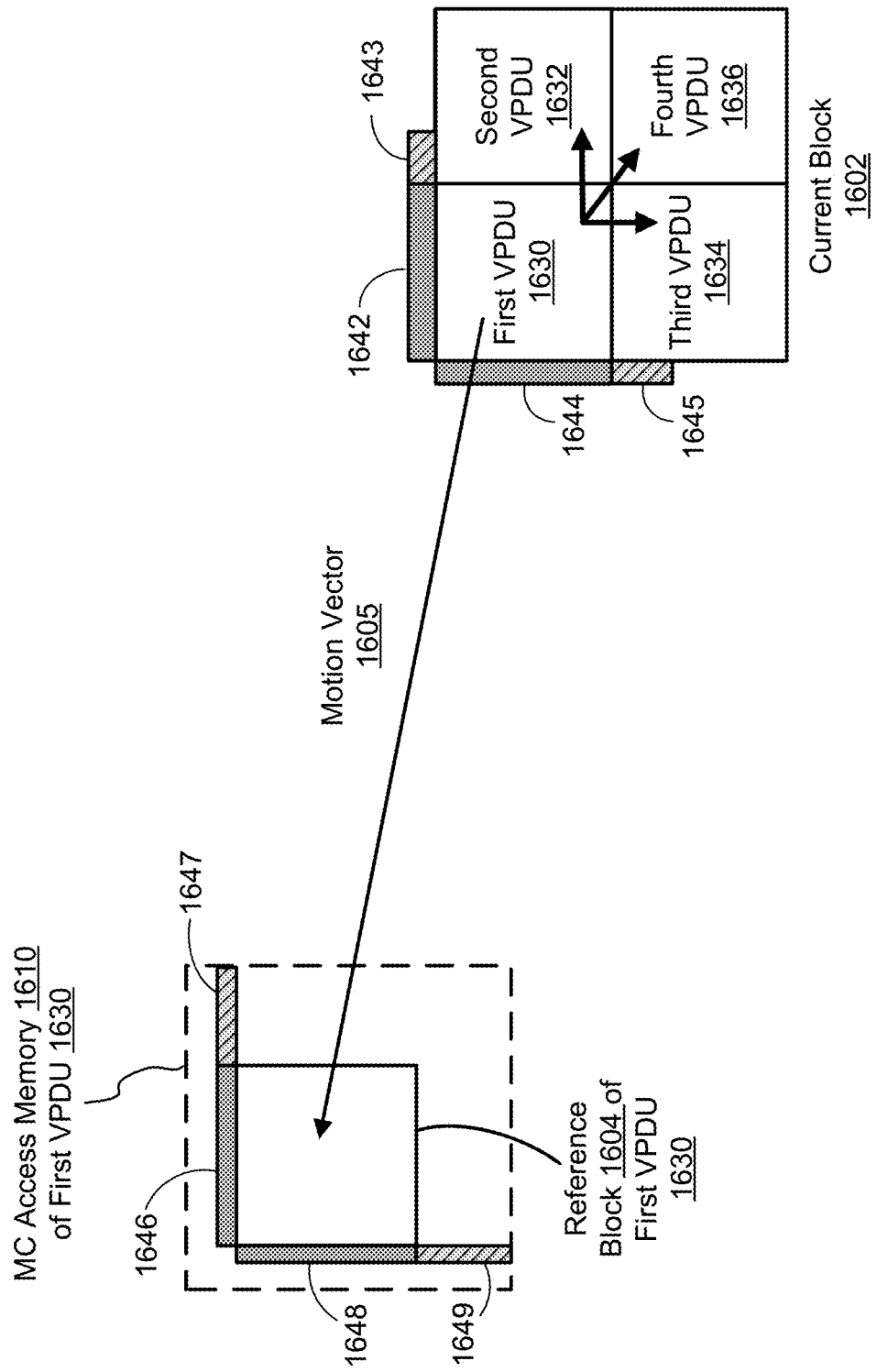
FIG. 16 is a conceptual diagram illustrating an example of performing LIC using additional samples in the motion compensation (MC) access memory of a VPDU, in accordance with some examples.

FIG. 16 is a diagram illustrating an example of determining samples for use in calculating IC parameters for a current block 1602 using such additional samples, where the additional samples are shown as gray blocks with a diagonal pattern. The current block 1602 can be a CU, a PU, a TU, or other block of a picture. The current block 1602 includes a first VPDU 1630, a second VPDU 1632, a third VPDU 1634, and a fourth VPDU 1636. As described in more detail below, in the example of FIG. 15, the IC parameters can be determined for the current block 1602 using an additional row of samples 1647 to the right of the reference block 1604 and an additional column samples 1649 below the reference block 1604, and also an additional row of samples 1643 to the right of the first VPDU 1630 and an additional column of samples 1645 below the first VPDU 1630. The number of lines and/or columns of those additional samples can be larger than one in some cases, as described below with respect to FIG. 17.

A coding device (e.g., the encoding device 104 and/or the decoding device 112) can identify, for use in determining the IC parameters for the current block 1602, a first row of samples 1642 from a top neighboring block (or from multiple top neighboring blocks) that is adjacent to the first VPDU 1630 and a first column of samples 1644 from a left neighboring block (or from multiple left neighboring blocks) that is adjacent to the first VPDU 1630. The first row of samples 1642 can include a bottom-most row of samples from the top neighboring block above the first VPDU 1630, and can be located immediately above a top-most row of samples in the current block 1602. The first column of samples 1644 can include a right-most column of samples from the left neighboring block to the left of the first VPDU 1630, and can be located immediately to the left of a left-most column of samples in the current block 1602.

The coding device can determine a reference block 1604 of the first VPDU 1630 using a motion vector 1605, which can be determined using any suitable technique used in inter-prediction (e.g., merge mode, advanced motion vector prediction (AMVP) mode, skip mode, and/or other inter-prediction technique), such as those described herein. The coding device can determine, for use in determining the IC parameters for the current block 1602, a first row of samples 1646 from a top neighboring block (or from multiple top neighboring blocks) that is adjacent to the reference block 1604 and a first column of samples 1648 from a left neighboring block (or from multiple left neighboring blocks) that is adjacent to the reference block 1604. The first row of samples 1646 can include a bottom-most row of samples from the top neighboring block above the reference block 1604. For example, the first row of samples 1646 can be located immediately above a top-most row of samples in the reference block 1604. The first column of samples 1648 can include a right-most column of samples from the left neighboring block to the left of the reference block 1604, and can be located immediately to the left of a left-most column of samples in the reference block 1604.

The coding device can determine that the additional row of samples 1647 and the additional column of samples 1649 are available in the MC access memory 1610 of the first VPDU 1630, and can use the additional row of samples 1647 and the additional column of samples 1649 for determining the IC parameters for the current block 1602. In some cases, the first row of samples 1646 and the additional row of samples 1647 can be from a same top neighboring block (or from multiple blocks) that is adjacent to the reference block 1604. For instance, a bottom-most row of the top neighboring block above the reference block 1604 can include the first row of samples 1646 and the additional row of samples 1647, which can be located immediately above a top-most row of samples in the reference block 1604. In some cases, the first row of samples 1646 can be from a first top neighboring block and the additional row of samples 1647 can be from a second top neighboring block that is different from the first top neighboring block, in which case the first top neighboring block and the second top neighboring block are adjacent to the reference block 1604. For instance, a bottom-most row of the first top neighboring block can include the first row of samples 1646 and can be located immediately above the top-most row of samples in the reference block 1604, and a bottom-most row of the second top neighboring block can include the additional row of samples 1647 and can be located immediately above the top-most row of samples in the reference block 1604.

In some cases, the first column of samples 1648 and the additional column of samples 1649 can be from a same left neighboring block (or from multiple blocks) that is adjacent to the reference block 1604. For example, a right-most column of the left neighboring block to the left of the reference block 1604 can include the first column of samples 1648 and the additional column of samples 1649, which can be located immediately to the left of a left-most column of samples in the reference block 1604. In some cases, the first column of samples 1648 can be from a first left neighboring block and the additional column of samples 1649 can be from a second left neighboring block that is different from the first left neighboring block, in which case the first left neighboring block and the second left neighboring block are adjacent to the reference block 1604. For instance, a right-most column of the first left neighboring block can include the first column of samples 1648 and can be located immediately to the left of the left-most column of samples in the reference block 1604. In such cases, a right-most column of the second left neighboring block can include the additional column of samples 1649 and can be located immediately to the left of the left-most column of samples in the reference block 1604.

In some examples, the coding device can also determine to use the additional row of samples 1643 that are adjacent to the second VPDU 1632 and the additional column of samples 1645 that are adjacent to the third VPDU 1634 for determining the IC parameters for the current block 1602. In some cases, the first row of samples 1642 and the additional row of samples 1643 can be from a same top neighboring block (or multiple top neighboring blocks) that is adjacent to the first VPDU 1630 and the second VPDU 1632. For instance, a bottom-most row of the top neighboring block above the first VPDU 1630 and the second VPDU 1632 can include the first row of samples 1642 and the additional row of samples 1643, which can be located immediately above a top-most row of samples in the current block 1602. In some cases, the first row of samples 1642 can be from a first top neighboring block and the additional row of samples 1643 can be from a second top neighboring block that is different from the first top neighboring block, where the first top neighboring block is adjacent to the first VPDU 1630 and the second top neighboring block is adjacent to the second VPDU 1632. For example, a bottom-most row of the first top neighboring block above the first VPDU 1630 can include the first row of samples 1642 and can be located immediately above the top-most row of samples in the current block 1602. In such cases, a bottom-most row of the second top neighboring block above the second VPDU 1632 can include the additional row of samples 1643 and can be located immediately above the top-most row of samples in the current block 1602.

In some cases, the first column of samples 1644 and the additional column of samples 1645 can be from a same left neighboring block (or from multiple blocks) that is adjacent to the first VPDU 1630 and the third VPDU 1634. For example, a right-most column of the left neighboring block to the left of the current block 1602 can include the first column of samples 1644 and the additional column of samples 1645, which can be located immediately to the left of a left-most column of samples in the current block 1602. In some cases, the first column of samples 1644 can be from a first left neighboring block and the additional column of samples 1645 can be from a second left neighboring block that is different from the first left neighboring block, where the first left neighboring block and the second left neighboring block are adjacent to the current block 1602. For instance, a right-most column of the first left neighboring block can include the first column of samples 1644 and can be located immediately to the left of the left-most column of samples in the current block 1602. A right-most column of the second left neighboring block can include the additional column of samples 1645 and can be located immediately to the left of the left-most column of samples in the current block 1602.

The first row of samples 1642 and the first column of samples 1644 neighboring the first VPDU 1630, the additional row of samples 1643 neighboring the second VPDU 1632, and the additional column of samples 1645 neighboring the third VPDU 1634 can be used as $Rec_{neig}$ in Equations (2) and (3) above, and the first row of samples 1646, the additional row of samples 1647, the first column of samples 1648, and the additional column of samples 1649 neighboring the reference block 1604 can be used as $Rec_{refneig}$ in Equations (2) and (3) above, and/or can be used by any other IC parameter derivation technique (e.g., that proposed in JEM) to determine the IC parameters for the first VPDU 1630. Similar to that described above, the first VPDU 1630 can share the calculated IC parameter with the second VPDU 1632, the third VPDU 1634, and the fourth VPDU 1636 in the current block 1602.

Similar to that described above, the MC access memory 1610 area of the first VPDU 1630 includes the first row of samples 1646, the additional row of samples 1647, the first column of samples 1648, and the additional column of samples 1649 neighboring the reference block 1604. Because such samples are in the MC access memory 1610 area, there is no additional impact to the memory bandwidth when IC is performed using these samples, and the additional samples 1643, 1645, 1647, and 1649 can be used to determine IC parameters for the current block 1602 without any increase in the number of VPDU pipeline stage cycles and with better coding performance of IC (e.g., as compared to the number of VPDU pipeline stage cycles used and the IC performance achieved by using the JVET-M0088 technique) because more samples are used to derive the IC parameters.

A coding device can determine to use any sub-combination of the samples shown in FIG. 16 for determining IC parameters for the current block 1602. For example, while the example of FIG. 16 is shown to include the first row of samples 1642, the additional row of samples 1643, the first column of samples 1644, and the additional column of samples 1645 neighboring the first VPDU 1630, the second VPDU 1632, and the third VPDU 1634, respectively, and to include the first row of samples 1646, the additional row of samples 1647, the first column of samples 1648, and the additional column of samples 1649 neighboring the reference block 1604, the coding device can use any sub-combination of these samples for determining IC parameters for the current block 1602. In one example, the coding device can determine to use the first row of samples 1642, the additional row of samples 1643, and the first column of samples 1644 for determining IC parameters for the current block 1602. In another example, the coding device can determine to use the first row of samples 1642, the first column of samples 1644, and the additional column of samples 1645 for determining IC parameters for the current block 1602. In yet another example, the first row of samples 1646, the additional row of samples 1647, and the first column of samples 1648 can be used by the coding device to determine IC parameters for the current block 1602. In another example, the coding device can determine to use the first row of samples 1646, the first column of samples 1648, and the additional column of samples 1649 neighboring the reference block 1604 for determining IC parameters for the current block 1602. In another example, the coding device can determine to use, for determining IC parameters for the current block 1602, the first row of samples 1642 and the first column of samples 1644 neighboring the first VPDU 1630, the additional row of samples 1643 neighboring the second VPDU 1632, and the additional column of samples 1645 neighboring the third VPDU 1634, and the first row of samples 1646 and the first column of samples 1648 neighboring the reference block 1604. In another example, the coding device can determine to use the first row of samples 1642 and the first column of samples 1644 neighboring the first VPDU 1630, and the first row of samples 1646, the additional row of samples 1647, the first column of samples 1648, and the additional column of samples 1649 neighboring the reference block 1604 for determining IC parameters for the current block 1602.

It will be appreciated that other combinations of the first row of samples 1642 and the first column of samples 1644 neighboring the first VPDU 1630, the first row of samples 1646 and the first column of samples 1648 neighboring the reference block 1604, and any of the additional samples (e.g., the additional row of samples 1643 neighboring the second VPDU 1632, the additional column of samples 1645 neighboring the third VPDU 1634, the additional row of samples 1647 neighboring the reference block 1604, and/or the additional column of samples 1649 neighboring the reference block 1604) can be used by a coding device to determine IC parameters for the current block 1602.

Figure 17:
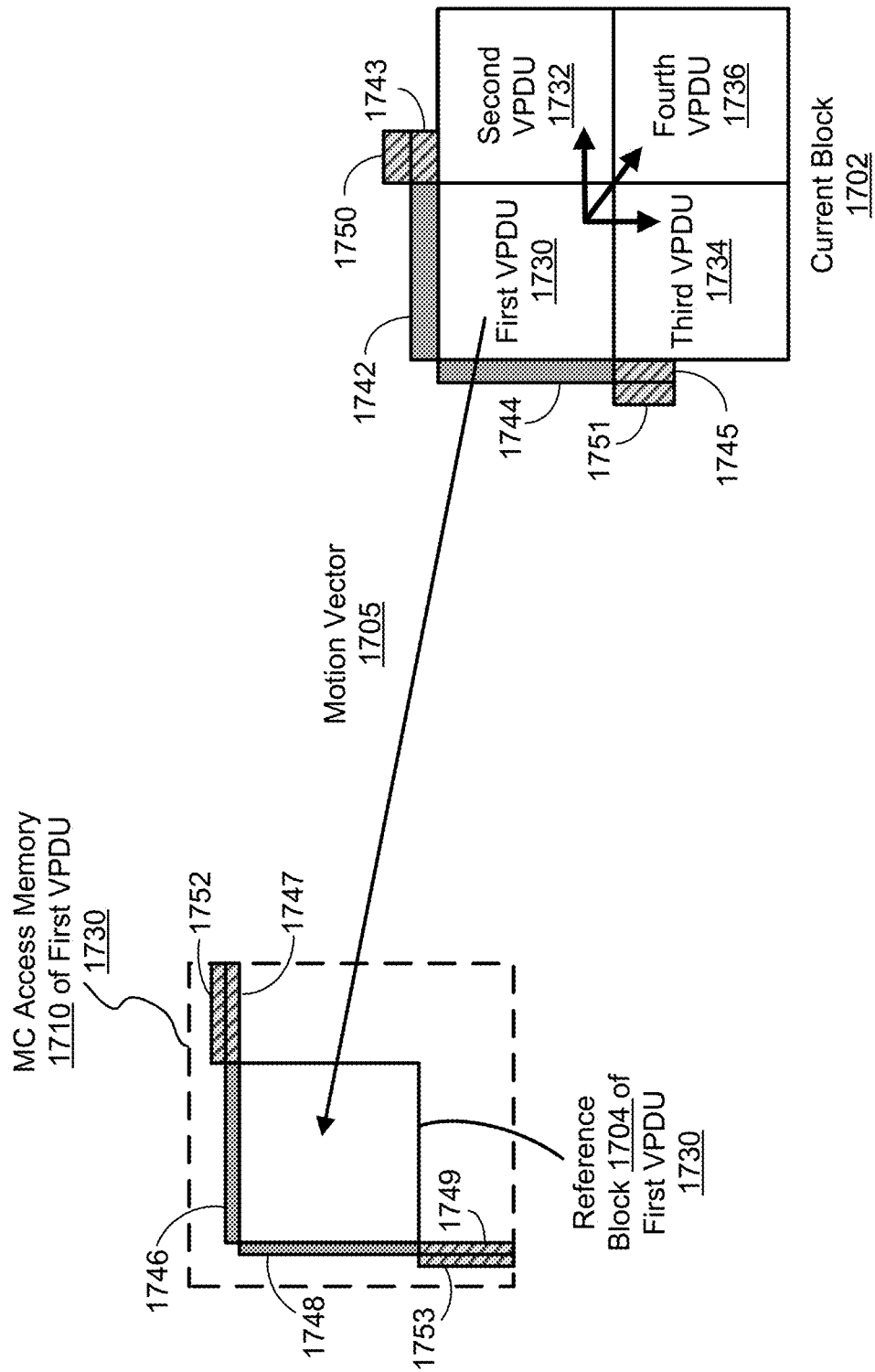
FIG. 17 is a conceptual diagram illustrating another example of performing LIC using additional samples in the MC access memory of a VPDU, in accordance with some examples.

FIG. 17 is a diagram illustrating another example of determining IC parameters for a current block 1702 using additional samples. The example in FIG. 17 is similar to that in FIG. 16, with additional rows and columns being used in addition to those used in the example of FIG. 16. For example, in addition to the first row of samples 1742, the first column of samples 1744, the additional row of samples 1743, and the additional column of samples 1745, an additional row of samples 1750 neighboring the second VPDU 1732 and an additional column of samples 1751 neighboring the third VPDU 1734 are used to determine the IC parameters for the current block 1702. Further, in addition to the first row of samples 1746, the first column of samples 1748, the additional row of samples 1747, and the additional column of samples 1749, an additional row of samples 1752 and an additional column of samples 1753 neighboring the reference block 1704 of the first VPDU 1730 are used to determine the IC parameters for the current block 1702. The reference block 1704 can be determined using the motion vector 1705.

Because the MC access memory 1710 area of the first VPDU 1730 includes the first row of samples 1746, the additional row of samples 1747, the additional row of samples 1752, the first column of samples 1748, the additional column of samples 1749, and the additional column of samples 1753 neighboring the reference block 1704, no additional impact to the memory bandwidth is present when IC is performed using these samples. The additional samples 1743, 1745, 1750, 1751, 1747, 1749, 1752, and 1753 can be used to determine IC parameters for the current block 1702 without any increase in the number of VPDU pipeline stage cycles and with better IC coding performance than that achieved by using the JVET-M0088 technique, because more samples are used to derive the IC parameters.

It will be appreciated that any combinations of the first row of samples 1742, the first column of samples 1744, the first row of samples 1746, the first column of samples 1748, and any of the additional samples (e.g., the additional samples 1743, 1745, 1750, 1751, 1747, 1749, 1752, and 1753) can be used by a coding device to determine IC parameters for the current block 1702.

As noted above, when a block contains multiple VPDUs, the LIC parameters determined for one VPDU of the multiple VPDUs can be shared among the other VPDUs, in which case IC parameters for only one of the VPDUs needs to be determined. In some examples, if a block contains multiple VPDUs, IC parameters can be derived for each VPDU separately. For example, referring to FIG. 15, the IC parameters for the first VPDU 1530 can be determined using the first row of samples 1542 and the first column of samples 1544 neighboring the first VPDU 1530, using the first row of samples 1546 and the second row of samples 1547 from the top neighboring block (or from multiple top neighboring blocks) that is adjacent to the reference block 1504, and using the first column of samples 1548 and the second column of samples 1549 from the left neighboring block (or from multiple left neighboring blocks) that is adjacent to the reference block 1504, as described above. The IC parameters for the second VPDU 1532 can be determined using the second row of samples 1543 and corresponding samples neighboring a reference block (not shown) for the second VPDU 1532. The IC parameters for the third VPDU 1534 can be determined using the second column of samples 1545 and corresponding samples neighboring a reference block (not shown) for the third VPDU 1534. The IC parameters for the fourth VPDU 1536 can be set to a default value (e.g., scaling factor a=1 and/or offset b=1), or the IC parameters from one or more of the first VPDU 1530, the second VPDU 1532, or the third VPDU 1534 can be shared with the fourth VPDU 1536.

Figure 18:
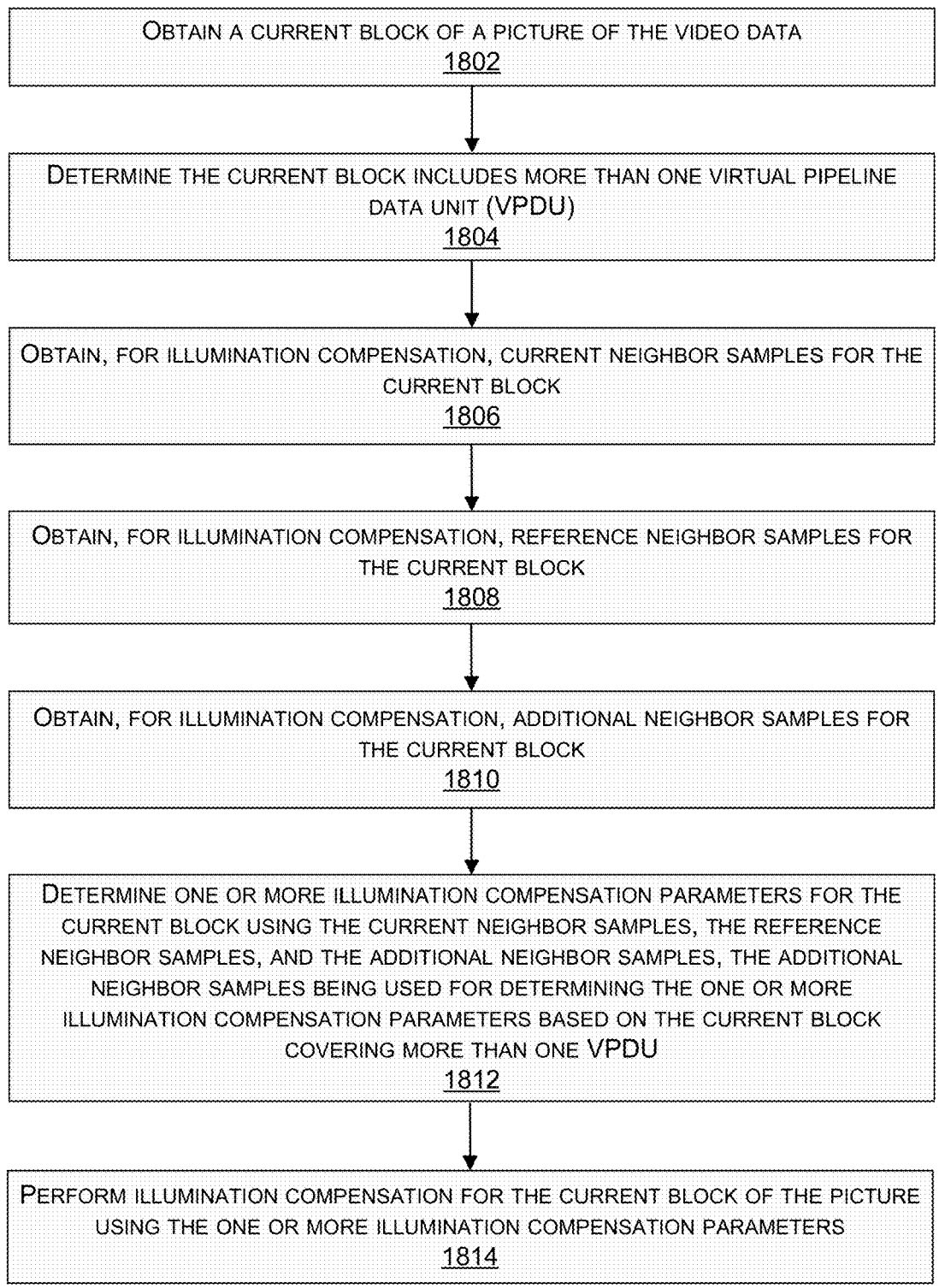
FIG. 18 is a flowchart illustrating an example of a process of processing video data, in accordance with some embodiments.

FIG. 18 is a flowchart illustrating an example of a process 1800 of processing video data using the techniques described herein. At block 1802, the process 1800 includes obtaining a current block of a picture of the video data.

At block 1804, the process 1800 includes determining the current block includes more than one virtual pipeline data unit (VPDU). For instance, the process 1800 can include determining a size of a VPDU, determining one or more of a width or a height of the current block, determining one or more of the width or the height of the current block is larger than the size of the VPDU, and determining the current block includes more than one VPDU based on determining one or more of the width or the height of the current block is larger than the size of the VPDU. In one illustrative example, the size of the VPDU can be 64×64 (with a width of 64 samples and a height of 64 samples). The block can include a size of 128×128 (with a width of 128 samples and a height of 128 samples). In such an example, the block can include four VPDUs, such as the block 1002 shown in the example of FIG. 10.

At block 1806, the process 1800 includes obtaining, for illumination compensation, current neighbor samples for the current block. The current neighbor samples include samples from a first row of samples from a first neighboring block of a first VPDU included in the current block, samples from a first column of samples from a second neighboring block of the first VPDU, or both the samples from the first row of samples from the first neighboring block and the samples from the first column of samples from the second neighboring block. In some implementations, the first neighboring block of the first VPDU includes a top neighboring block and the second neighboring block of the first VPDU includes a left neighboring block. In one illustrative example, the current neighbor samples can include the first row of samples 1442 and/or the first column of samples 1444 shown in FIG. 14.

At block 1808, the process 1800 includes obtaining, for illumination compensation, reference neighbor samples for the current block. The reference neighbor samples include samples from a first row of samples from a first neighboring block of a reference block, samples from a first column of samples from a second neighboring block of the reference block, or both the samples from the first row of samples from the first neighboring block and the samples from the first column of samples from a second neighboring block of the reference block. In some implementations, the first neighboring block of the reference block includes a top neighboring block and the second neighboring block of the reference block includes a left neighboring block. In one illustrative example, the current neighbor samples can include the first row of samples 1446 and/or the first column of samples 1448 shown in FIG. 14.

At block 1810, the process 1800 includes obtaining, for illumination compensation, additional neighbor samples for the current block. The additional neighbor samples can include additional samples other than the current neighbor samples for the current block and the reference neighbor samples for the current block. For instance, the additional samples can include a second row of samples from the first neighboring block of the first VPDU, a second column of samples from the second neighboring block of the first VPDU, a second row of samples from the first neighboring block of the reference block, a second column of samples from the second neighboring block of the reference block, samples from a neighboring block of a second VPDU included in the current block, or any combination thereof.

In one illustrative example, the additional neighbor samples include samples from the second row of samples from the first neighboring block of the first VPDU and samples from the second column of samples from the second neighboring block of the first VPDU. For instance, referring to FIG. 14 as an illustrative example, the additional neighbor samples can include the second row of samples 1443 from the top neighboring block adjacent to the first VPDU 1430 and the second column of samples 1445 from the left neighboring block that is adjacent to the first VPDU 1430. In some cases, the second row of samples from the first neighboring block of the first VPDU includes at least two rows of samples (e.g., the second row of samples 1443 and at least one other row of samples), and/or the second column of samples from the second neighboring block of the first VPDU includes at least two columns of samples (e.g., the second column of samples 1445 and at least one other column of samples).

In another illustrative example, the additional neighbor samples include samples from the second row of samples from the first neighboring block of the first VPDU, samples from second column of samples from the second neighboring block of the first VPDU, samples from the second row of samples from the first neighboring block of the reference block, and samples from the second column of samples from the second neighboring block of the reference block. For instance, again referring to FIG. 14 as an illustrative example, the additional neighbor samples can include the second row of samples 1443 from the top neighboring block adjacent to the first VPDU 1430, the second column of samples 1445 from the left neighboring block that is adjacent to the first VPDU 1430, the second row of samples 1447 from the top neighboring block adjacent to the reference block 1404, and second column of samples 1449 from the left neighboring block adjacent to the reference block 1404. In some cases, the second row of samples from the first neighboring block of the first VPDU includes at least two rows of samples, the second column of samples from the second neighboring block of the first VPDU includes at least two columns of samples, the second row of samples from the first neighboring block of the reference block includes at least two rows of samples, and/or the second column of samples from the second neighboring block of the reference block includes at least two columns of samples.

In another illustrative example, the additional neighbor samples include the samples from the neighboring block of the second VPDU included in the current block. In some cases, the additional neighbor samples include samples from a neighboring block of a third VPDU included in the current block. In some cases, the samples from the neighboring block of the second VPDU include a row of samples from the neighboring block of the second VPDU, and the samples from the neighboring block of the third VPDU include a column of samples from the neighboring block of the third VPDU. For example, referring to FIG. 15, the samples from the neighboring block of the second VPDU include the second row of samples 1543, and the samples from the neighboring block of the third VPDU include the second column of samples 1545. In some examples, the row of samples from the first neighboring block of the second VPDU includes at least two rows of samples, and the column of samples from the neighboring block of the third VPDU includes at least two columns of samples.

In another illustrative example, the additional neighbor samples include the samples from the neighboring block of the second VPDU, samples from the second row of samples from the first neighboring block of the reference block, and samples from the second column of samples from the second neighboring block of the reference block. In some cases, the samples from the neighboring block of the second VPDU include a row of samples from the neighboring block of the second VPDU and a column of samples from a neighboring block of a third VPDU. For example, referring to FIG. 15, the additional samples can include the second row of samples 1543 neighboring the second VPDU 1532, the second column of samples 1545 neighboring the third VPDU 1534, the second row of samples 1547 neighboring the reference block 1504, and the second column of samples 1549 neighboring the reference block 1504.

In another example, the additional neighbor samples include one or more of samples to a right of a top neighboring row of the current block, samples below a left neighboring column of the current block, samples to a right of a top neighboring row of the reference block, and/or samples below a left neighboring column of the reference block. For instance, referring to FIG. 16 as an illustrative example, the samples to the right of the top neighboring row of the current block include the additional row of samples 1643 to the right of the first VPDU 1630, the samples below the left neighboring column of the current block include the additional column of samples 1645 below the first VPDU 1630, the samples to the right of the top neighboring row of the reference block include the additional row of samples 1647 to the right of the reference block 1604, and the samples below the left neighboring column of the reference block include the additional column samples 1649 below the reference block 1604.

At block 1812, the process 1800 includes determining one or more illumination compensation parameters for the current block using the current neighbor samples, the reference neighbor samples, and the additional neighbor samples. The additional neighbor samples are used for determining the one or more illumination compensation parameters based on the current block covering more than one VPDU. For example, as noted above, when a block includes more than one VPDU, such as the example illustrated in FIG. 10, neighboring samples used for IC parameter calculation for the block (e.g., for calculating one or more offsets b and/or one or more weights or scaling factors a) lead to the need for additional memory access and to increased bandwidth usage. The additional neighbor samples can be determined in such a way that there is no need for additional memory access or increased bandwidth usage (e.g., such that the MC access memory for a given VPDU, such as the reference block 1604 for the first VPDU 1630, is needed for encoding and/or decoding the block).

At block 1814, the process 1800 includes performing illumination compensation for the current block of the picture using the one or more illumination compensation parameters. The one or more illumination compensation parameters include at least one scaling factor and at least one offset. As described above, determining the one or more illumination compensation parameters for the current block can include minimizing a difference between samples from one or more neighboring blocks of the current block and samples from one or more neighboring blocks of a reference block of the current block. For instance, determining the one or more illumination compensation parameters for the current block can include minimizing a difference between the samples from the first row of samples from the first neighboring block of the first VPDU and/or the samples from the first column of samples from the second neighboring block of the first VPDU, and the samples from the first row of samples from the first neighboring block of the reference block and/or the samples from the first column of samples from the second neighboring block of the reference block.

In some examples, as described above, subsampling is not applied to samples from the first neighboring block of the first VPDU, samples from the second neighboring block of the first VPDU, samples from the first neighboring block of the reference block, and samples from the second neighboring block of the reference block when performing illumination compensation for the current block.

In some examples, the process 1800 can include decoding the current block of video data based on performing the illumination compensation for the current block. For instance, the process 1800 can include determining a residual value for the current block, performing a prediction mode for the current block, and reconstructing at least one sample of the current block based on the illumination compensation performed for the current block, the residual value for the current block, and the prediction mode performed for the current block.

In some examples, the process 1800 can include generating an encoded video bitstream. The encoded video bitstream can include at least a portion of the current block of video data. In some examples, the process 1800 can include signaling the encoded video bitstream. In some cases, the process 1800 can include signaling the one or more illumination compensation parameters in the encoded video bitstream.

Figure 19:
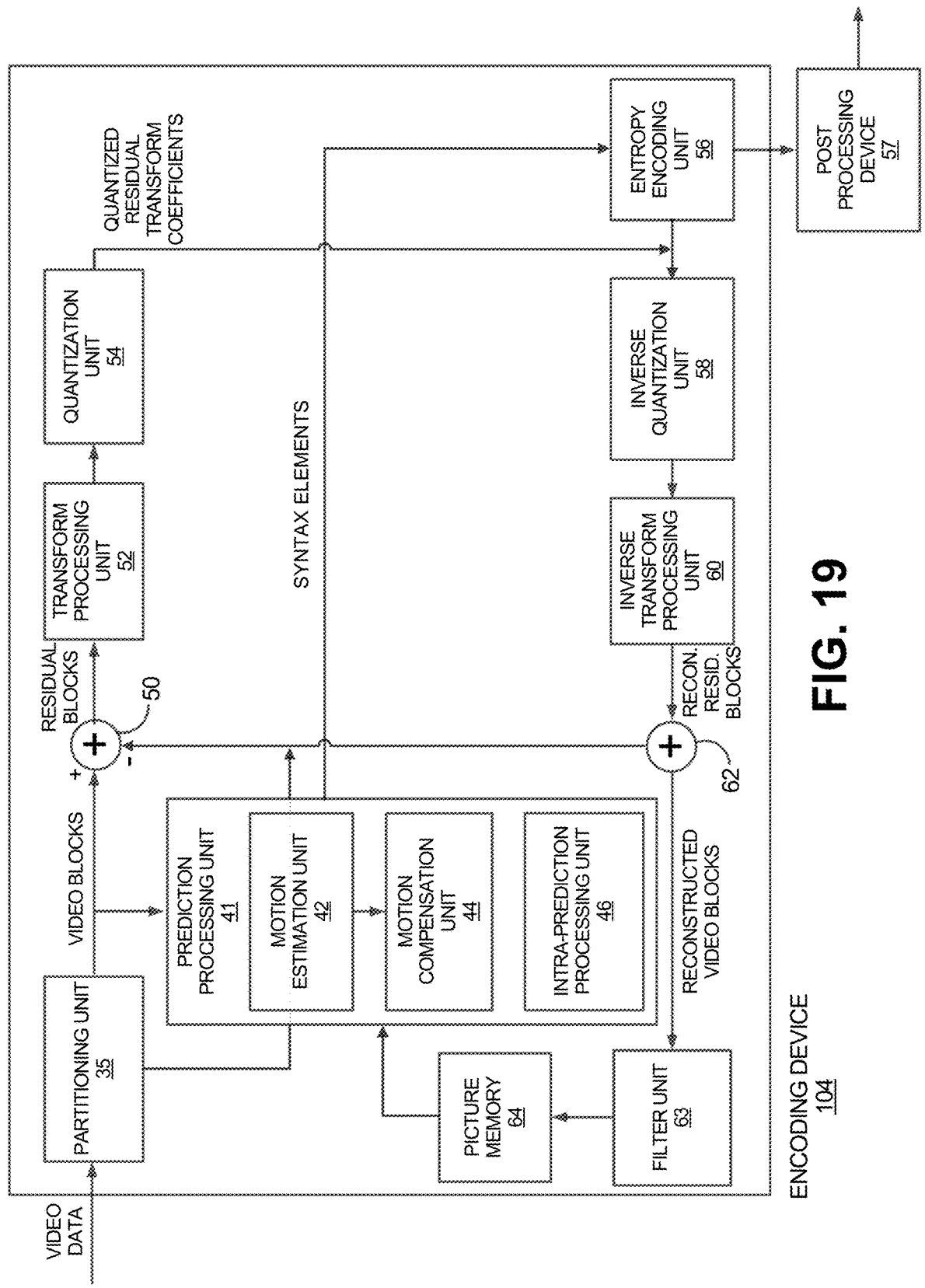
FIG. 19 is a block diagram illustrating an example video encoding device, in accordance with some examples.
Figure 20:
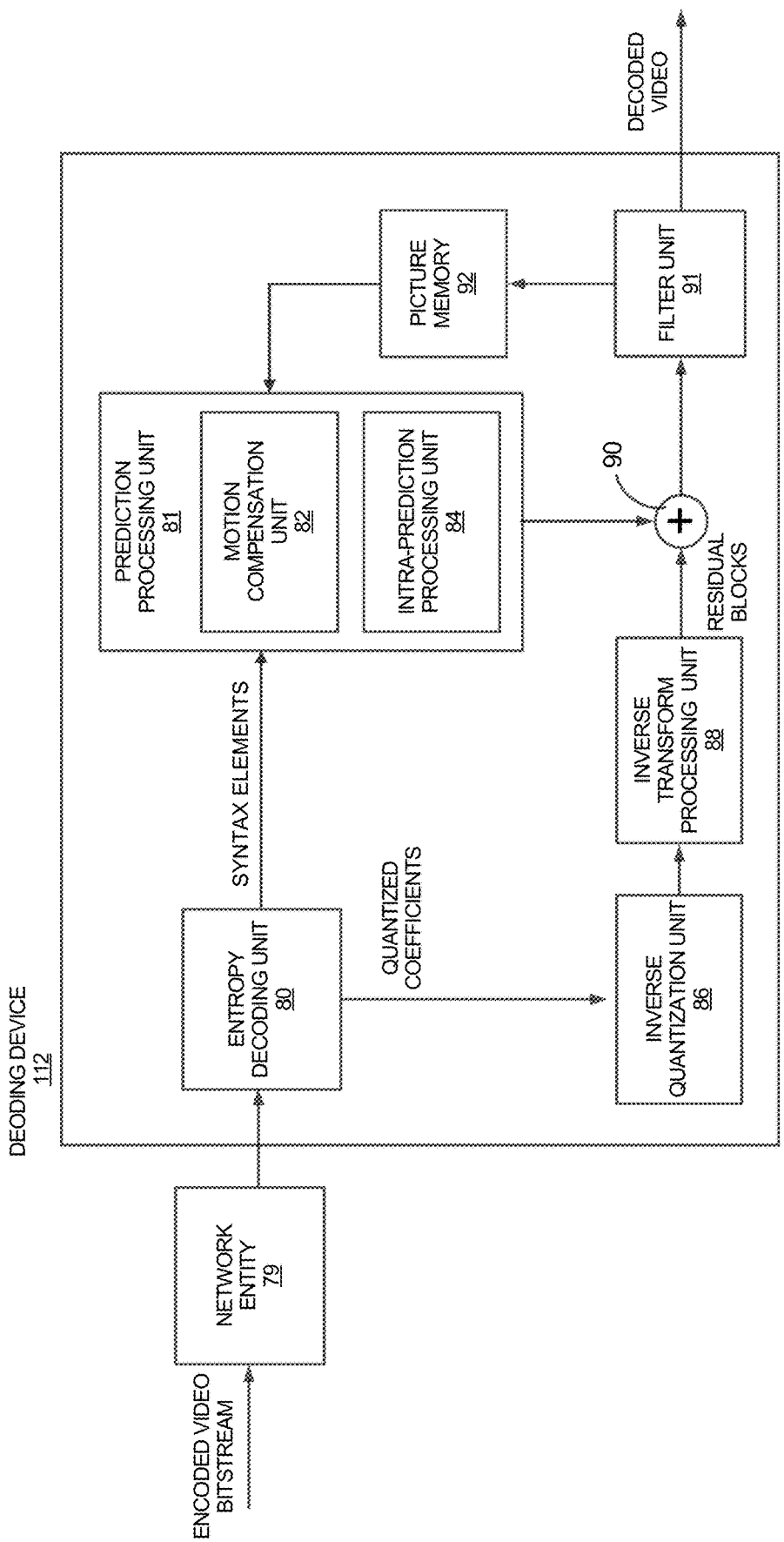
FIG. 20 is a block diagram illustrating an example video decoding device, in accordance with some examples.

In some implementations, the processes described herein (including process 1800) can be performed by a computing device or an apparatus, such as the system 100 shown in FIG. 1. For example, the processes can be performed by the encoding device 104 shown in FIG. 1 and FIG. 19, by another video source-side device or video transmission device, by the decoding device 112 shown in FIG. 1 and FIG. 20, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 1800. In some examples, the computing device may include a mobile device, a desktop computer, a server computer and/or server system, or other type of computing device. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein (including process 1800) can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1800) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs. CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 11 and FIG. 12, respectively. FIG. 11 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 11, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 11 represents an example of a video encoder configured to perform any of the techniques described herein, including the process described above with respect to FIG. 18. In some cases, some of the techniques of this disclosure may also be implemented by post processing device 57.

FIG. 12 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (1) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 12 represents an example of a video decoder configured to perform any of the techniques described herein, including the process described above with respect to FIG. 18.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data. etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of processing video data. The method includes: obtaining a current block of a picture of the video data; determining the current block includes more than one virtual pipeline data unit (VPDU); obtaining, for illumination compensation, current neighbor samples for the current block, the current neighbor samples including samples from one or more of a first row of samples from a first neighboring block of a first VPDU included in the current block or a first column of samples from a second neighboring block of the first VPDU; obtaining, for illumination compensation, reference neighbor samples for the current block, the reference neighbor samples including samples from one or more of a first row of samples from a first neighboring block of a reference block or a first column of samples from a second neighboring block of the reference block; obtaining, for illumination compensation, additional neighbor samples for the current block, the additional neighbor samples including samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block; determining one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and performing illumination compensation for the current block of the picture using the one or more illumination compensation parameters.

Example 2

A method according to Example 1, further comprising: determining a size of a VPDU; determining one or more of a width or a height of the current block; determining one or more of the width or the height of the current block is larger than the size of the VPDU; and determining the current block includes more than one VPDU based on determining one or more of the width or the height of the current block is larger than the size of the VPDU.

Example 3

A method according to any of Examples 1 or 2, wherein the first neighboring block of the first VPDU includes a top neighboring block, the second neighboring block of the first VPDU includes a left neighboring block, the first neighboring block of the reference block includes a top neighboring block, and the second neighboring block of the reference block includes a left neighboring block.

Example 4

A method according to any of Examples 1 to 3, wherein subsampling is not applied to samples from the first neighboring block of the first VPDU, samples from the second neighboring block of the first VPDU, samples from the first neighboring block of the reference block, and samples from the second neighboring block of the reference block when performing illumination compensation for the current block.

Example 5

A method according to any of Examples 1 to 4, wherein the additional neighbor samples include samples from the second row of samples from the first neighboring block of the first VPDU and samples from the second column of samples from the second neighboring block of the first VPDU.

Example 6

A method according to Example 5, wherein the second row of samples from the first neighboring block of the first VPDU includes at least two rows of samples, and wherein the second column of samples from the second neighboring block of the first VPDU includes at least two columns of samples.

Example 7

A method according to any of Examples 1 to 6, wherein the additional neighbor samples include samples from the second row of samples from the first neighboring block of the first VPDU, samples from second column of samples from the second neighboring block of the first VPDU, samples from the second row of samples from the first neighboring block of the reference block, and samples from the second column of samples from the second neighboring block of the reference block.

Example 8

A method according to Example 7, wherein the second row of samples from the first neighboring block of the first VPDU includes at least two rows of samples, wherein the second column of samples from the second neighboring block of the first VPDU includes at least two columns of samples, wherein the second row of samples from the first neighboring block of the reference block includes at least two rows of samples, and wherein the second column of samples from the second neighboring block of the reference block includes at least two columns of samples.

Example 9

A method according to any of Examples 1 to 8, wherein the additional neighbor samples include the samples from the neighboring block of the second VPDU included in the current block.

Example 10

A method according to any of Example 9, wherein the additional neighbor samples include samples from a neighboring block of a third VPDU included in the current block.

Example 11

A method according to Example 9, wherein the samples from the neighboring block of the second VPDU include a row of samples from the neighboring block of the second VPDU, and wherein the samples from the neighboring block of the third VPDU include a column of samples from the neighboring block of the third VPDU.

Example 12

A method according to Example 11, wherein the row of samples from the first neighboring block of the second VPDU includes at least two rows of samples, and wherein the column of samples from the neighboring block of the third VPDU includes at least two columns of samples.

Example 13

A method according to any of Examples 1 to 12, wherein the additional neighbor samples include the samples from the neighboring block of the second VPDU, samples from the second row of samples from the first neighboring block of the reference block, and samples from the second column of samples from the second neighboring block of the reference block.

Example 14

A method according to Example 13, wherein the samples from the neighboring block of the second VPDU include a row of samples from the neighboring block of the second VPDU and a column of samples from a neighboring block of a third VPDU.

Example 15

A method according to any of Examples 1 to 14, wherein the additional neighbor samples include one or more of samples to a right of a top neighboring row of the current block, samples below a left neighboring column of the current block, samples to a right of a top neighboring row of the reference block, or samples below a left neighboring column of the reference block.

Example 16

A method according to any of Examples 1 to 15, wherein determining the one or more illumination compensation parameters for the current block includes minimizing a difference between one or more of the samples from the first row of samples from the first neighboring block of the first VPDU or the samples from the first column of samples from the second neighboring block of the first VPDU and one or more of the samples from the first row of samples from the first neighboring block of the reference block or the samples from the first column of samples from the second neighboring block of the reference block.

Example 17

A method according to any of Examples 1 to 16, wherein the one or more illumination compensation parameters include at least one scaling factor and at least one offset.

Example 18

A method according to any of Examples 1 to 17, further comprising decoding the current block of video data based on performing the illumination compensation for the current block.

Example 19

A method according to any of Examples 1 to 18, further comprising: determining a residual value for the current block; performing a prediction mode for the current block; and reconstructing at least one sample of the current block based on the illumination compensation performed for the current block, the residual value for the current block, and the prediction mode performed for the current block.

Example 20

A method according to any of Examples 1 to 19, further comprising generating an encoded video bitstream, the encoded video bitstream including at least a portion of the current block of video data.

Example 21

A method according to Example 20, further comprising signaling the encoded video bitstream.

Example 22

A method according to Example 20, further comprising signaling the one or more illumination compensation parameters in the encoded video bitstream.

Example 23

An apparatus for processing video data according to any of Examples 1 to 22. For example, the apparatus can include at least one memory and one or more processors implemented in circuitry. The one or more processors are configured to: obtain a current block of a picture of the video data; determine the current block includes more than one virtual pipeline data unit (VPDU); obtain, for illumination compensation, current neighbor samples for the current block, the current neighbor samples including samples from one or more of a first row of samples from a first neighboring block of a first VPDU included in the current block or a first column of samples from a second neighboring block of the first VPDU; obtain, for illumination compensation, reference neighbor samples for the current block, the reference neighbor samples including samples from one or more of a first row of samples from a first neighboring block of a reference block or a first column of samples from a second neighboring block of the reference block; obtain, for illumination compensation, additional neighbor samples for the current block, the additional neighbor samples including samples from one or more of a second row of samples from the first neighboring block of the first VPDU, a second column of samples from the second neighboring block of the first VPDU, a second row of samples from the first neighboring block of the reference block, a second column of samples from the second neighboring block of the reference block, or samples from a neighboring block of a second VPDU included in the current block; determine one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and perform illumination compensation for the current block of the picture using the one or more illumination compensation parameters.

Example 24

An apparatus according to Example 23, wherein the apparatus comprises a mobile device with a camera for capturing one or more pictures.

Example 25

An apparatus according to any of Examples 23 to 24, further comprising a display for displaying one or more pictures.

Example 26

A computer readable medium having stored thereon instructions that when executed by a processor perform the methods of any of examples 1 to 22.

Example 27

An apparatus for processing video data, the apparatus includes means for performing any of the operations of the methods of any of examples 1 to 22.

Example 28

A method of processing video data, the method comprising: obtaining a block of the video data; determining the block covers more than one virtual pipeline data unit (VPDU); determining not to apply illumination compensation to the block based on the block covering more than one VPDU; and processing the block of the video data.

Example 29

A method according to Example 28, wherein determining the block covers more than one VPDU includes: determining the size of a VPDU; determining one or more of a width or a height of the block; and determining one or more of the width or the height of the block is larger than the size of the VPDU.

Example 30

A method according to any of Examples 28 to 29, further comprising determining not to signal an illumination compensation flag for the block in response to determining not to apply illumination compensation to the block, wherein an illumination compensation flag indicates whether illumination compensation applies for a block.

Example 31

A method according to any of Examples 28 to 30, wherein determining not to apply illumination compensation to the block includes disabling illumination compensation for the block based on determining bi-prediction is not used for the block.

Example 32

A method according to any of Examples 28 to 31, further comprising: obtaining an additional block of the video data; and performing illumincation compensation for the additional block, wherein performing the illumination compensation includes: deriving one or more illumination compensation parameters for the additional block; and applying the one or more illumination compensation parameters to the additional block.

Example 33

A method according to Example 32, wherein the one or more illumination compensation parameters for the additional block are derived using neighboring reconstructed samples.

Example 34

A method according to Example 33, wherein the neighboring reconstructed samples are from one or more of a first neighboring block of the additional block and a second neighboring block of a reference block used for inter-prediction.

Example 35

A method according to Example 34, wherein the first neighboring block includes one or more of a top neighboring block or a left neighboring block of the additional block, and wherein the second neighboring block includes one or more of a top neighboring block or a left neighboring block of the reference block.

Example 36

A method according to any of Examples 34 to 35, wherein deriving the one or more illumination compensation parameters for the additional block includes minimizing a difference between reconstructed samples of the first neighboring block and reconstructed samples of the second neighboring block.

Example 37

A method according to any of Examples 32 to 36, wherein the one or more illumination compensation parameters include at least one scaling factor and at least one offset.

Example 38

A method according to any of Examples 32 to 37, wherein performing the illumination compensation on the additional block results in an illumination compensated predictor, and further comprising decoding the additional block using the illumination compensated predictor.

Example 39

A method according to any of Examples 32 to 38, further comprising signaling the one or more illumination compensation parameters in an encoded video bitstream.

Example 40

A method according to any of Examples 28 to 39, wherein processing the block of the video data includes decoding the block of video data.

Example 41

A method according to any of Examples 28 to 40, wherein processing the block of the video data includes generating an encoded video bitstream, the encoded video bitstream including the block of video data.

Example 42

A method according to Example 41, further comprising signaling the encoded video bitstream.

Example 43

An apparatus comprising a memory configured to store video data and a processor configured to process the video data according to any of examples 28 to 42.

Example 44

An apparatus according to Example 43, wherein the apparatus includes a decoder.

Example 45

An apparatus according to any of Examples 43 to 44, wherein the apparatus includes an encoder.

Example 46

An apparatus according to any of Examples 43 to 45, wherein the apparatus is a mobile device.

Example 47

An apparatus according to any of Examples 43 to 46, wherein the apparatus includes a display configured to display the video data.

Example 48

An apparatus according to any of Examples 43 to 47, wherein the apparatus includes a camera configured to capture one or more pictures.

Example 49

A computer readable medium having stored thereon instructions that when executed by a processor perform the methods of any of examples 28 to 42.

Example 50

A method of processing video data, the method comprising: obtaining a block of the video data; determining the block covers more than one virtual pipeline data unit (VPDU); performing illumincation compensation for the block, wherein performing the illumination compensation includes deriving one or more illumination compensation parameters for the block using samples from a first neighboring block of a current VPDU of the block and a second neighboring block of the current VPDU, a first neighboring block of a reference block and a second neighboring block of the reference block, and additional samples, wherein the additional samples being used based on the block covering more than one VPDU; and processing the block of the video data.

Example 51

A method according to Example 50, wherein determining the block covers more than one VPDU includes: determining the size of a VPDU; determining one or more of a width or a height of the block; and determining one or more of the width or the height of the block is larger than the size of the VPDU.

Example 52

A method according to any of Examples 50 to 51, wherein the first neighboring block of the current block includes a top neighboring block, wherein the second neighboring block of the current block includes a left neighboring block, wherein the first neighboring block of the reference block includes a top neighboring block, and wherein the second neighboring block of the reference block includes a left neighboring block.

Example 53

A method according to any of Examples 50 to 52, wherein down-sampling is not applied to one or more of the samples of the first neighboring block of the current block, the samples of the second neighboring block of the current block, the samples of the first neighboring block of the reference block, and the samples of the second neighboring block of the reference block.

Example 54

A method according to any of Examples 50 to 53, wherein the additional samples include samples from one or more of an additional row of the first neighboring block of the current block, an additional column of the second neighboring block of the current block, an additional row of the first neighboring block of the reference block, and an additional column of the second neighboring block of the reference block.

Example 55

A method according to Example 54, wherein the additional samples include at least two rows of the first neighboring block of the current block, at least two columns of the second neighboring block of the current block, at least two rows of the first neighboring block of the reference block, and at least two columns of the second neighboring block of the reference block.

Example 56

A method according to any of Examples 50 to 55, wherein the additional samples include neighboring samples from one or more other VPDUs of the block.

Example 57

A method according to Example 56, wherein the additional samples further include samples from an additional row of the first neighboring block of the reference block and an additional column of the second neighboring block of the reference block.

Example 58

A method according to Example 57, wherein the additional samples include at least two rows of the first neighboring block of the reference block and at least two columns of the second neighboring block of the reference block.

Example 59

A method according to any of Examples 50 to 58, wherein the additional samples include one or more of samples to a right of a top neighboring row of the current block, samples below a left neighboring column of the current block, samples to a right of a top neighboring row of the reference block, and samples below a left neighboring column of the reference block.

Example 60

A method according to any of Examples 50 to 59, further comprising applying the one or more illumination compensation parameters to the block.

Example 61

A method according to any of Examples 50 to 60, wherein the one or more illumination compensation parameters for the block are derived using neighboring reconstructed samples.

Example 62

A method according to Example 61, wherein the neighboring reconstructed samples are from one or more of a first neighboring block of the block and a second neighboring block of a reference block used for inter-prediction.

Example 63

A method according to Example 62, wherein the first neighboring block includes one or more of a top neighboring block or a left neighboring block of the block, and wherein the second neighboring block includes one or more of a top neighboring block or a left neighboring block of the reference block.

Example 64

A method according to any of Examples 62 to 63, wherein deriving the one or more illumination compensation parameters for the block includes minimizing a difference between reconstructed samples of the first neighboring block and reconstructed samples of the second neighboring block.

Example 65

A method according to any of Examples 50 to 64, wherein the one or more illumination compensation parameters include at least one scaling factor and at least one offset.

Example 66

A method according to any of Examples 50 to 65, wherein performing the illumination compensation on the block results in an illumination compensated predictor, and further comprising decoding the block using the illumination compensated predictor.

Example 67

A method according to any of Examples 50 to 66, further comprising signaling the one or more illumination compensation parameters in an encoded video bitstream.

Example 68

A method according to any of Examples 50 to 67, wherein processing the block of the video data includes decoding the block of video data.

Example 69

A method according to any of Examples 50 to 68, wherein processing the block of the video data includes generating an encoded video bitstream, the encoded video bitstream including the block of video data.

Example 70

A method according to Example 69, further comprising signaling the encoded video bitstream.

Example 71

An apparatus comprising a memory configured to store video data and a processor configured to process the video data according to any of examples 60 to 70.

Example 72

An apparatus according to Examples 71, wherein the apparatus includes a decoder.

Example 73

An apparatus according to any of Examples 71 to 72, wherein the apparatus includes an encoder.

Example 74

An apparatus according to any of Examples 71 to 73, wherein the apparatus is a mobile device.

Example 75

An apparatus according to any of Examples 71 to 74, wherein the apparatus includes a display configured to display the video data.

Example 76

An apparatus according to any of Examples 71 to 75, wherein the apparatus includes a camera configured to capture one or more pictures.

Example 77

A computer readable medium having stored thereon instructions that when executed by a processor perform the methods of any of examples 50 to 70.

What is claimed is:

1. A method of processing video data, the method comprising:
obtaining a current block of a picture of the video data;
determining the current block includes more than one virtual pipeline data unit (VPDU);
obtaining, for illumination compensation, current neighbor samples for the current block, the current neighbor samples including samples from one or more of a first row of samples from a first neighboring block of a first VPDU included in the current block or a first column of samples from a second neighboring block of the first VPDU;
obtaining, for illumination compensation, reference neighbor samples for the current block, the reference neighbor samples including samples from one or more of a first row of samples from a first neighboring block of a reference block or a first column of samples from a second neighboring block of the reference block;
obtaining, for illumination compensation, additional neighbor samples for the current block that are different from the current neighbor samples and the reference neighbor samples, the additional neighbor samples including samples from one or more of a second row of samples from the first neighboring block of the first VPDU that is different from the first row of samples from the first neighboring block of the first VPDU, a second column of samples from the second neighboring block of the first VPDU that is different from the first column of samples from the second neighboring block of the first VPDU, a second row of samples from the first neighboring block of the reference block that is different from the first row of samples from the first neighboring block of the reference block, a second column of samples from the second neighboring block of the reference block that is different from the first column of samples from the second neighboring block of the reference block, or samples from a neighboring block of a second VPDU included in the current block;
determining one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and
performing illumination compensation for the current block of the picture using the one or more illumination compensation parameters.

2. The method of claim 1, further comprising:
determining a size of a VPDU;
determining one or more of a width or a height of the current block;
determining one or more of the width or the height of the current block is larger than the size of the VPDU; and
determining the current block includes more than one VPDU based on determining one or more of the width or the height of the current block is larger than the size of the VPDU.

3. The method of claim 1, wherein the first neighboring block of the first VPDU includes a top neighboring block, the second neighboring block of the first VPDU includes a left neighboring block, the first neighboring block of the reference block includes a top neighboring block, and the second neighboring block of the reference block includes a left neighboring block.

4. The method of claim 1, wherein subsampling is not applied to samples from the first neighboring block of the first VPDU, samples from the second neighboring block of the first VPDU, samples from the first neighboring block of the reference block, and samples from the second neighboring block of the reference block when performing illumination compensation for the current block.

5. The method of claim 1, wherein the additional neighbor samples include samples from the second row of samples from the first neighboring block of the first VPDU and samples from the second column of samples from the second neighboring block of the first VPDU.

6. The method of claim 5, wherein the second row of samples from the first neighboring block of the first VPDU includes at least two rows of samples, and wherein the second column of samples from the second neighboring block of the first VPDU includes at least two columns of samples.

7. The method of claim 1, wherein the additional neighbor samples include samples from the second row of samples from the first neighboring block of the first VPDU, samples from second column of samples from the second neighboring block of the first VPDU, samples from the second row of samples from the first neighboring block of the reference block, and samples from the second column of samples from the second neighboring block of the reference block.

8. The method of claim 7, wherein the second row of samples from the first neighboring block of the first VPDU includes at least two rows of samples, wherein the second column of samples from the second neighboring block of the first VPDU includes at least two columns of samples, wherein the second row of samples from the first neighboring block of the reference block includes at least two rows of samples, and wherein the second column of samples from the second neighboring block of the reference block includes at least two columns of samples.

9. The method of claim 1, wherein the additional neighbor samples include the samples from the neighboring block of the second VPDU included in the current block.

10. The method of claim 9, wherein the additional neighbor samples include samples from a neighboring block of a third VPDU included in the current block.

11. The method of claim 10, wherein the samples from the neighboring block of the second VPDU include a row of samples from the neighboring block of the second VPDU, and wherein the samples from the neighboring block of the third VPDU include a column of samples from the neighboring block of the third VPDU.

12. The method of claim 11, wherein the row of samples from the first neighboring block of the second VPDU includes at least two rows of samples, and wherein the column of samples from the neighboring block of the third VPDU includes at least two columns of samples.

13. The method of claim 1, wherein the additional neighbor samples include the samples from the neighboring block of the second VPDU, samples from the second row of samples from the first neighboring block of the reference block, and samples from the second column of samples from the second neighboring block of the reference block.

14. The method of claim 13, wherein the samples from the neighboring block of the second VPDU include a row of samples from the neighboring block of the second VPDU and a column of samples from a neighboring block of a third VPDU.

15. The method of claim 1, wherein the additional neighbor samples include one or more of samples to a right of a top neighboring row of the current block, samples below a left neighboring column of the current block, samples to a right of a top neighboring row of the reference block, or samples below a left neighboring column of the reference block.

16. The method of claim 1, wherein determining the one or more illumination compensation parameters for the current block includes minimizing a difference between one or more of the samples from the first row of samples from the first neighboring block of the first VPDU or the samples from the first column of samples from the second neighboring block of the first VPDU and one or more of the samples from the first row of samples from the first neighboring block of the reference block or the samples from the first column of samples from the second neighboring block of the reference block.

17. The method of claim 1, wherein the one or more illumination compensation parameters include at least one scaling factor and at least one offset.

18. The method of claim 1, further comprising decoding the current block of video data based on performing the illumination compensation for the current block.

19. The method of claim 1, further comprising:
determining a residual value for the current block;
performing a prediction mode for the current block; and
reconstructing at least one sample of the current block based on the illumination compensation performed for the current block, the residual value for the current block, and the prediction mode performed for the current block.

20. The method of claim 1, further comprising generating an encoded video bitstream, the encoded video bitstream including at least a portion of the current block of video data.

21. The method of claim 20, further comprising signaling the encoded video bitstream.

22. The method of claim 20, further comprising signaling the one or more illumination compensation parameters in the encoded video bitstream.

23. An apparatus for processing video data, the apparatus comprising:
at least one memory; and
one or more processors implemented in circuitry and configured to:
obtain a current block of a picture of the video data;
determine the current block includes more than one virtual pipeline data unit (VPDU);
obtain, for illumination compensation, current neighbor samples for the current block, the current neighbor samples including samples from one or more of a first row of samples from a first neighboring block of a first VPDU included in the current block or a first column of samples from a second neighboring block of the first VPDU;
obtain, for illumination compensation, reference neighbor samples for the current block, the reference neighbor samples including samples from one or more of a first row of samples from a first neighboring block of a reference block or a first column of samples from a second neighboring block of the reference block;
obtain, for illumination compensation, additional neighbor samples for the current block that are different from the current neighbor samples and the reference neighbor samples, the additional neighbor samples including samples from one or more of a second row of samples from the first neighboring block of the first VPDU that is different from the first row of samples from the first neighboring block of the first VPDU, a second column of samples from the second neighboring block of the first VPDU that is different from the first column of samples from the second neighboring block of the first VPDU, a second row of samples from the first neighboring block of the reference block that is different from the first row of samples from the first neighboring block of the reference block, a second column of samples from the second neighboring block of the reference block that is different from the first column of samples from the second neighboring block of the reference block, or samples from a neighboring block of a second VPDU included in the current block;
determine one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and
perform illumination compensation for the current block of the picture using the one or more illumination compensation parameters.

24. The apparatus of claim 23, further comprising:
determining a size of a VPDU;
determining one or more of a width or a height of the current block;
determining one or more of the width or the height of the current block is larger than the size of the VPDU; and
determining the current block includes more than one VPDU based on determining one or more of the width or the height of the current block is larger than the size of the VPDU.

25. The apparatus of claim 23, wherein the first neighboring block of the first VPDU includes a top neighboring block, the second neighboring block of the first VPDU includes a left neighboring block, the first neighboring block of the reference block includes a top neighboring block, and the second neighboring block of the reference block includes a left neighboring block.

26. The apparatus of claim 23, wherein the additional neighbor samples include samples from the second row of samples from the first neighboring block of the first VPDU and samples from the second column of samples from the second neighboring block of the first VPDU.

27. The apparatus of claim 23, wherein the additional neighbor samples include samples from the second row of samples from the first neighboring block of the first VPDU, samples from second column of samples from the second neighboring block of the first VPDU, samples from the second row of samples from the first neighboring block of the reference block, and samples from the second column of samples from the second neighboring block of the reference block.

28. The apparatus of claim 23, wherein the apparatus comprises a mobile device with a camera for capturing one or more pictures.

29. The apparatus of claim 23, further comprising a display for displaying one or more pictures.

30. A non-transitory computer-readable medium having stored thereon instructions that, when executed by one or more processors, cause the one or more processors to:
obtain a current block of a picture of video data;
determine the current block includes more than one virtual pipeline data unit (VPDU);

obtain, for illumination compensation, current neighbor samples for the current block, the current neighbor samples including samples from one or more of a first row of samples from a first neighboring block of a first VPDU included in the current block or a first column of samples from a second neighboring block of the first VPDU;

obtain, for illumination compensation, reference neighbor samples for the current block, the reference neighbor samples including samples from one or more of a first row of samples from a first neighboring block of a reference block or a first column of samples from a second neighboring block of the reference block;

obtain, for illumination compensation, additional neighbor samples for the current block that are different from the current neighbor samples and the reference neighbor samples, the additional neighbor samples including samples from one or more of a second row of samples from the first neighboring block of the first VPDU that is different from the first row of samples from the first neighboring block of the first VPDU, a second column of samples from the second neighboring block of the first VPDU that is different from the first column of samples from the second neighboring block of the first VPDU, a second row of samples from the first neighboring block of the reference block that is different from the first row of samples from the first neighboring block of the reference block, a second column of samples from the second neighboring block of the reference block that is different from the first column of samples from the second neighboring block of the reference block, or samples from a neighboring block of a second VPDU included in the current block;

determine one or more illumination compensation parameters for the current block using the current neighbor samples, the reference neighbor samples, and the additional neighbor samples, the additional neighbor samples being used for determining the one or more illumination compensation parameters based on the current block covering more than one VPDU; and perform illumination compensation for the current block of the picture using the one or more illumination compensation parameters.

\* \* \* \* \*